US011266056B2

(12) United States Patent
Nair et al.

(10) Patent No.: US 11,266,056 B2
(45) Date of Patent: Mar. 8, 2022

(54) SYSTEM AND METHOD FOR RESIDUE DETECTION AND IMPLEMENT CONTROL

(71) Applicant: Deere & Company, Moline, IL (US)

(72) Inventors: Ranjit Nair, Pune (IN); Adam D. Sporrer, Ankeny, IA (US); Kirti Balani, Amravat (IN); Ricky B. Theilen, Bettendorf, IA (US); Lucas B. Larsen, Ankeny, IA (US); Vishal Rane, Pune (IN); David L. Steinlage, Centralia, KS (US); Robert T. Casper, Mingo, IA (US); John M. Schweitzer, Ankeny, IA (US); Jeremy D. Krantz, Polk City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/940,801

(22) Filed: Nov. 13, 2015

(65) Prior Publication Data

US 2017/0112043 A1    Apr. 27, 2017

Related U.S. Application Data

(60) Provisional application No. 62/245,682, filed on Oct. 23, 2015.

(51) Int. Cl.
*A01B 63/00* (2006.01)
*G05B 15/02* (2006.01)
(Continued)

(52) U.S. Cl.
CPC .......... *A01B 63/002* (2013.01); *A01B 17/002* (2013.01); *A01B 33/08* (2013.01);
(Continued)

(58) Field of Classification Search
CPC ........ A01B 63/002; A01B 33/08; G05B 15/02
(Continued)

(56) References Cited

U.S. PATENT DOCUMENTS

| 4,843,561 A | 6/1989 | Larson |
| 5,653,292 A | 8/1997 | Ptack et al. |

(Continued)

FOREIGN PATENT DOCUMENTS

| BR | PI0605229 A | 7/2008 |
| CN | 102282925 A | 12/2011 |

(Continued)

OTHER PUBLICATIONS

Precision Agriculture. Dynamically Adjustable Tillage Systems from Gates Manufacturing. News Letter. Jun. 16, 2015, https://www.agriculture.com/machinery/precision-agriculture/dynamically-adjustable-tillage-system_234-ar49223.
(Continued)

*Primary Examiner* — Khoi H Tran
*Assistant Examiner* — Rodney P King

(57) ABSTRACT

A residue detection and implement control system and method are disclosed for an agricultural implement. The system includes a source of environment data and image data of an imaged area of a crop field containing residue. The system includes a data store containing a plurality of image processing methods and at least one controller that processes the image data according to one or more image processing instruction sets. The controller selects one or more of the image processing methods based on the environment data, and processes the image data using the selected image processing instruction(s) to determine a value corresponding to residue coverage in the imaged area of the field. The controller adjusts the configuration of the agricultural implement to respond to the amount and type of residue detected.

18 Claims, 7 Drawing Sheets

(51) Int. Cl.
*A01B 33/08* (2006.01)
*A01B 41/06* (2006.01)
*A01B 17/00* (2006.01)
*A01B 33/16* (2006.01)
*A01B 79/00* (2006.01)

(52) U.S. Cl.
CPC .............. *A01B 33/16* (2013.01); *A01B 41/06* (2013.01); *G05B 15/02* (2013.01); *A01B 79/005* (2013.01)

(58) Field of Classification Search
USPC .......................................................... 701/50
See application file for complete search history.

(56) References Cited

U.S. PATENT DOCUMENTS

| | | | |
|---|---|---|---|
| 5,765,116 A * | 6/1998 | Wilson-Jones | G05D 1/0246 180/168 |
| 5,961,573 A | 10/1999 | Hale et al. | |
| 5,987,862 A | 11/1999 | Long et al. | |
| 6,070,673 A | 6/2000 | Wendte | |
| 6,750,898 B1 | 6/2004 | Ishida et al. | |
| 8,027,770 B2 | 9/2011 | Poulsen | |
| 8,448,717 B2 | 5/2013 | Adams et al. | |
| 8,463,510 B2 | 6/2013 | Knapp | |
| 8,504,252 B2 | 8/2013 | Hamilton et al. | |
| 8,657,026 B2 | 2/2014 | Friesen | |
| 8,731,234 B1 * | 5/2014 | Ciarcia | 382/100 |
| 8,862,339 B2 | 10/2014 | Henry et al. | |
| 9,282,688 B2 | 3/2016 | Casper et al. | |
| 9,668,399 B2 | 6/2017 | Gates | |
| 2005/0075784 A1 * | 4/2005 | Gray | G01C 21/00 701/25 |
| 2006/0086295 A1 * | 4/2006 | Jensen | A01C 7/00 111/118 |
| 2006/0206243 A1 * | 9/2006 | Pawlicki | B60Q 1/525 701/1 |
| 2007/0271013 A1 * | 11/2007 | Jochem | A01B 69/001 701/28 |
| 2008/0140431 A1 | 6/2008 | Anderson et al. | |
| 2009/0076674 A1 | 3/2009 | Kiegerl et al. | |
| 2009/0210119 A1 | 8/2009 | Poulsen | |
| 2011/0093169 A1 | 4/2011 | Schroeder et al. | |
| 2011/0231069 A1 * | 9/2011 | Ryder | A01B 63/32 701/50 |
| 2012/0048159 A1 | 3/2012 | Adams | |
| 2012/0048160 A1 | 3/2012 | Adams et al. | |
| 2012/0089304 A1 | 4/2012 | Hamilton et al. | |
| 2012/0095652 A1 | 4/2012 | Anderson | |
| 2012/0123650 A1 * | 5/2012 | Diekhans | A01D 43/085 701/50 |
| 2012/0191431 A1 * | 7/2012 | Dunbabin | E02F 9/2029 703/6 |
| 2012/0245802 A1 | 9/2012 | Schlesser et al. | |
| 2013/0158863 A1 * | 6/2013 | Skvarce | G08G 1/168 701/428 |
| 2013/0177670 A1 | 7/2013 | Steckel et al. | |
| 2013/0197767 A1 | 8/2013 | Lenz | |
| 2013/0238201 A1 * | 9/2013 | Redden | G06K 9/2036 701/50 |
| 2014/0041563 A1 | 2/2014 | Henry | |
| 2014/0116735 A1 | 5/2014 | Bassett | |
| 2014/0303854 A1 | 10/2014 | Zielke | |
| 2014/0358381 A1 | 12/2014 | Holland | |
| 2015/0040528 A1 | 2/2015 | Grotelueschen et al. | |
| 2015/0075066 A1 * | 3/2015 | Stowe | A01D 34/015 47/1.3 |
| 2016/0029547 A1 | 2/2016 | Casper et al. | |
| 2016/0078611 A1 * | 3/2016 | Butts | B65G 43/08 382/110 |

FOREIGN PATENT DOCUMENTS

| | | |
|---|---|---|
| CN | 103293974 A | 9/2013 |
| DE | 10349321 A1 | 5/2005 |
| DE | 102011051827 A1 | 1/2013 |
| EP | 2668469 B1 | 4/2017 |
| JP | 9000137 A | 1/1997 |
| WO | 2008135867 A3 | 3/2009 |
| WO | 2013134480 A1 | 9/2013 |
| WO | 2017049186 A1 | 3/2017 |

OTHER PUBLICATIONS

Farm Food Care.Org, Farming & The Environment, Crop Residue Cover Assessment with a Mobile Technology Application on Ontario Farmland, Informational Page, http://www.farmfoodcareon.org/wp-content/uploads/2016/04/WRAMI-Final-Report-21.pdf.

Science Direct, Using the mobile phone as Munsell soil-colour sensor: An experiment under controlled illumination conditions. Computers and Electronics in Agriculture, vol. 99, Nov. 2013, pp. 200-208, http://www.sciencedirect.com/science/article/pii/S0168169913002445.

* cited by examiner

SYSTEM AND METHOD FOR RESIDUE DETECTION AND IMPLEMENT CONTROL

RELATED APPLICATIONS

This disclosure relates generally to fluid operation systems such as used in agricultural sprayers. This patent application also claims priority to U.S. Provisional Patent Application Ser. No. 62/245,682, filed Oct. 23, 2015, and entitled, SYSTEM AND METHOD FOR RESIDUE DETECTION AND IMPLEMENT CONTROL, the contents of which are incorporated herein by reference.

FIELD

This disclosure relates to detecting residue coverage in an imaged area of an agricultural field and the control of an implement based on the detected residue coverage.

BACKGROUND

Various agricultural or other operations may result in residue covering a portion of the area addressed by the operation. In an agricultural setting, for example, residue may include straw, corn stalks, or various other types of plant material, which may be either cut or un-cut, and either loose or attached to the ground to varying degrees. Agricultural residue may result, for example, after harvesting and cutting down the corn crop, which may result in residue of various sizes covering the ground to various degrees.

SUMMARY

This disclosure provides embodiments of a residue detection in an imaged area of a field and implement control to maintain a desired amount of residue coverage.

In one embodiment, the system includes a source of environment data having an indication of environmental factors, and a source of image data having an imaged area of a field containing residue. The system also includes a data store containing a plurality of image processing instructions and at least one controller operatively coupled to the sources of environmental and image data and the data store. The at least one controller processes the image data according to one or more of the plurality of image processing instructions. The at least one controller selects one or more of the plurality of image processing instructions based on the environment data, and processes the image data using the selected one or more of the plurality of image processing instructions to determine a value corresponding to residue coverage in the imaged area of the field. The at least one controller generates one or more control signals for the implement based on the determined value of residue coverage.

In another embodiment, the method includes receiving environmental data having an indication of environmental factors, and receiving image data having an imaged area of a field containing residue. The method also includes selecting, by at least one controller, one or more of a plurality of image processing methods for processing the image data based on the environmental data, and processing, by the at least one controller, the image data based on the selected one or more of the plurality of image processing methods. The method includes determining, by the at least one controller, a value corresponding to residue coverage in the imaged area of the field based on the processing and generating one or more control signals for the implement based on the determined value of residue coverage. Other operation modes, features and embodiments are disclosed in the detailed description, accompanying drawings and claims.

BRIEF DESCRIPTION OF THE DRAWINGS

The details of one or more implementations are set forth in the accompanying example drawings, the description and claims below.

DETAILED DESCRIPTION

Figure 1:
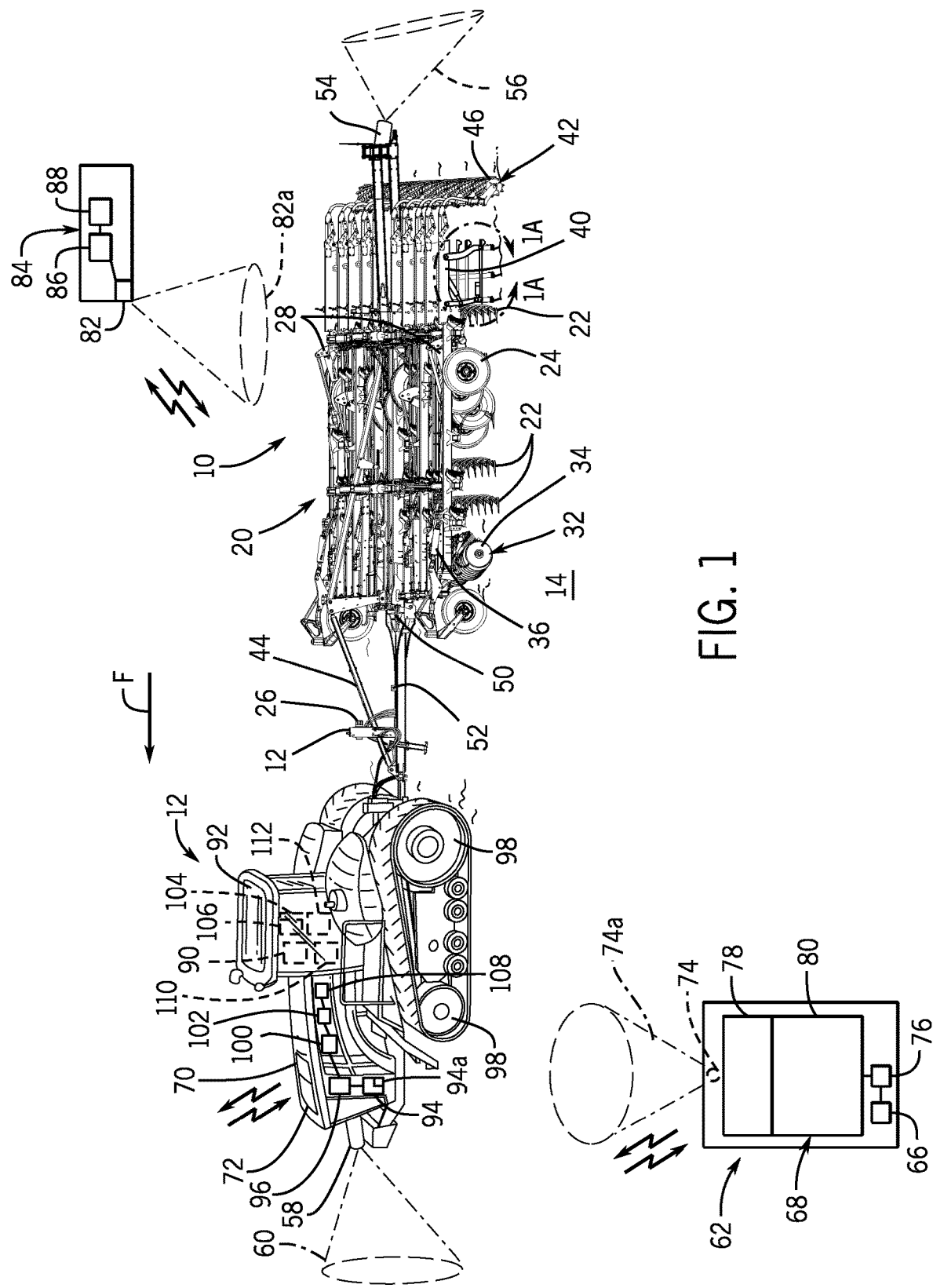
FIG. 1 is a perspective view of an example work machine in the form of a tractor towing an implement in which the disclosed residue detection and control system and method may be used.

Embodiments of a system and method are described to assess the amount or size of residue in a crop field when conducting tillage or planting operations, and then the agricultural or crop care implement can automatically respond, self-adjust or be manually (e.g. by command) adjusted to work with the amount and type of residue detected. After harvesting much residue is left after all the crops are cut down. Afterwards or next season, an agricultural implement drives through and works the field. A seed planter or tillage cultivator, vertical tillage, or mulcher, etc., self adjusts and responds to the amount of residue detected and can selectively leave a desired amount of residue or even completely overturn the residue in the field depending on inputs from the operator or type of crop being planted. Adjustments include: changing a speed of the tractor, depth of furrow to plant the seeds, changing a depth and level of the disks, shanks and other ground engaging tools mounted to a frame of the tillage implement, changing the gang angle; changing disk angles, changing a distance between disks and shanks or other parts of the crop care implement, adjusting an overall level of the implement, changing an aggressiveness of the cutters or closing disks, changing a harrow down pressure or other field finisher, and so on. In order for the crop care implement to automatically or manually make an appropriate physical tool adjustment based on the residue, the residue is detected by mounting sensors and image cameras on the tractor (e.g. cab or hood) and/or also in the rear on the crop care implement frame. In some embodiments, the residue detection is conducted from drones overhead, satellite or ground scouts. The detected residue data or information may be transmitted to a cloud server or to a remote computing device so that operators elsewhere can receive the information to make decisions or to simply observe the on-going physical operations.

The size and percentage of residue may vary from location to location even within a single field, depending on factors such as the local terrain and soil conditions of the field, local plant coverage, residue characteristics before the instant tillage (or other) operation, and so on. Residue on a field is characterized at least by a percent coverage (i.e., a percentage of a given area of ground that is covered by residue) and a characteristic residue size or hardness (e.g., an average, nominal, or other measurement of the length, width or area of particular pieces of residue).

In certain applications, it may be useful to understand the characteristics of residue coverage with relative accuracy. For example, certain regulatory standards addressing erosion and other issues may specify a target percent coverage for residue after a particular operation, such as a primary or secondary tillage operation, a planting operation, a spraying operation, and so on. In various instances, it may also be useful to understand the characteristic (e.g., average) size of residue over a given area of a field. In certain operations, it is useful to understand both percent coverage and residue size. For example, in order to execute an effective primary tillage operation an operator may endeavor to leave at least 30% residue coverage, with no more than 10% of residue material being larger than 4 inches long.

In example operation, for a primary tillage (or other), it may be useful to provide a control system that determines the percent coverage and characteristic size of residue on a portion of field that has already been tilled (or otherwise addressed), then utilize the determined percent coverage and characteristic size to guide the continuing tillage (or other) operation or a future operation (e.g., a secondary tillage operation or planting operation) on the same field. In some embodiments, one or more camera assemblies are provided for a tillage (or other) implement, capable of capturing visible, infrared, or other images of a field on which the implement is operating. In some embodiments, at least one camera is mounted to the top of the tractor cab or tractor hood or to the tillage implement so as to capture images of an area of ground ahead or behind the tractor and tillage implement. In some embodiments, at least one other camera may be mounted to a work vehicle so as to capture images of an area of ground between the disks or after the closing disks. Tillage implements include cultivators, vertical tillage, compact disks, coulters, and so on. Aside from tillage, planting machines can similarly benefit from residue monitoring so that seeds can be planted at more optimal depths. For instance, if there is more residue, the cutters can dig deeper in the soil so that the seeds are deposited at a desired depth in the soil.

In some embodiments, the various camera assemblies may capture images in the visible spectrum, in color or in grayscale, in infrared, based upon reflectance or fluorescence, or otherwise. One or more camera assemblies may include stereo image camera assemblies capable of capturing stereo images of the field. For example, one or more camera assemblies may include a stereo camera with two or more lenses and image sensors, or one or more camera assemblies may include multiple cameras arranged to capture stereoscopic images of the field.

In some embodiments, images from behind an implement (i.e., "aft" images) may be analyzed, in order to determine indicators of residue coverage for areas of a field that have already been tilled (or otherwise addressed by the relevant operation). In some embodiments, images from ahead of a tractor or an implement (i.e., "forward" images) may also be analyzed, in order to determine indicators of residue coverage for areas of field that have not yet been tilled (or otherwise addressed) in the current pass of the implement. The forward images (or residue coverage information derived therefrom) may then be compared with aft images of the same (or similar) areas of the field (or residue coverage information derived therefrom) in order to assess the change in residue coverage due to the instant operation.

Once a residue coverage value has been determined, the indicator may be utilized to control aspects of a future operation over the field. For example, in an ongoing tillage operation, if a residue value from an aft image indicates insufficient residue coverage or size, various aspects of the relevant tillage implement (e.g., disk, shank or tine depth) may be automatically adjusted in order to provide greater residue coverage or size. Similarly, if a comparison of residue values from forward and aft images indicates that an ongoing tillage operation is decreasing residue coverage or size too aggressively, various aspects of the relevant implement may be automatically adjusted accordingly.

The following describes one or more example implementations of the disclosed system for residue detection and implement control, as shown in the accompanying figures of the drawings described briefly above. The disclosed control systems (and work vehicles on which they are implemented) provide for improved residue detection and implement control by selecting one or more image processing methods to process an imaged area of a field based on the environmental conditions or factors associated with the field. By selecting the one or more image processing methods based on the environmental factors, the residue coverage is more accurately detected in the imaged area of the field. By more accurately detecting the value of residue coverage, the implement may be controlled to more accurately remove or reduce the residue coverage on the field to a desired value of residue coverage.

In some embodiments, the controller may be included on the relevant implement (e.g., as part of an embedded control system). In some embodiments, the controller may be included on another platform (e.g., a tractor towing the implement or a remote ground-station) and may communicate with various devices on the implement (e.g., various control devices) via various known means. In some embodiments, the controller may be in communication with a CAN bus associated with the implement or an associated work vehicle, in order to send and receive relevant control and data signals.

The example system and method described herein may be employed with respect to a variety of implements, including various agricultural or other work implements. In some embodiments, the described system and method may be implemented with respect to a tillage implement. The system and method disclosed herein may be used with various other work implements, such as to control a row cleaner associated with a planter. Referring to FIG. 1, in some embodiments, the disclosed system and method may be used with a tillage implement 10, which is towed by a work vehicle 12, such as a tractor. The configuration of the tillage implement 10 coupled to the work vehicle 12 is presented as an example only. Embodiments of the disclosed system and method detects a value of residue in an imaged area of a field 14 and controls the tillage implement 10 to maintain a desired value for the residue coverage on the field 14. In some embodiments, the tillage instrument 10 also includes one or more ground-engaging instruments, such as a tine harrow assembly, which may be adjustable from a cab of the work vehicle 12.

In the embodiment depicted, tillage implement 10 includes a coupling mechanism 16 for coupling the tillage implement 10 to the work vehicle 12. This may allow tillage implement 10 to be towed across a field 14 in forward direction F in order to execute a tillage operation. Other embodiments may include self-driven implements that may execute various operations without being towed by a separate vehicle. Moreover, the depicted embodiment illustrates the work vehicle 12 as a tractor, such as a four wheel drive tractor. The work vehicle 12 may comprise any suitable vehicle for towing the tillage implement 10, and thus, the use of the tractor is merely an example.

Tillage implement 10 may further include a frame 20, which may be connected to the coupling mechanism 16 and extends in an aft direction away from the coupling mechanism 16. In other embodiments, the tillage implement 10 may include multiple frame sections coupled together via one or more hinges to enable folding or relative movement between adjacent frame sections, if desired.

A first set of ground-engaging tools may be coupled to the frame 20. For example, one or more sets of shanks 22 may be coupled to the frame 20. Other tools may additionally (or alternatively) be utilized. In some embodiments a plurality of wheel assemblies 24 may also be coupled to the frame 20, in order to support the frame 20 above the field 14.

The example tillage implement 10 includes (or may be in communication with) one or more controllers, which may include various electrical, computerized, electro-hydraulic, or other controllers. In some embodiments, for example, an electrohydraulic controller 26 is mounted to the coupling mechanism 16. The controller 26 may include various processors (not shown) coupled with various memory architectures (not shown), as well as one or more electrohydraulic valves (not shown) to control the flow of hydraulic control signals to various devices and tools included on the tillage implement 10. In some embodiments, the controller 26 is in communication with a CAN bus associated with the tillage implement 10 or the work vehicle 12.

In some embodiments, one or more hydraulic cylinders 28 (or other lift devices) are coupled to the frame 20 and to the wheel assemblies 24. The hydraulic cylinders 28 are in hydraulic (or other) communication with the controller 26, such that the controller 26 may signal the hydraulic cylinders 28 to raise or lower the frame 20 relative to the field 14 in order to move the various shanks 22 or disks 34 to various orientations relative to the field 14 soil. In some embodiments, activation of the hydraulic cylinders 28 by the controller 26 may result in the disks 34 or shanks 22 being moved over a range of sixteen inches or more. Such movement of the shanks 22 relative to the field 14 may be useful with regard to residue management. For example, deeper penetration of the shanks 22 into the field 14 may tend to bury more plant matter and therefore result in smaller percentage coverage of residue remaining after the movement of the tillage implement 10 over the field 14.

In some embodiments, the hydraulic cylinders 28 (or another lift device) are coupled directly to the disks 34 and shanks 22 (or associated support components) rather than the wheel assemblies 24, in order to directly adjust the angle of the disks and the shanks 22 relative to the agricultural implement frame or to the field 14.

In some embodiments, a second set of ground-engaging tools are coupled to the frame 20. For example, a set of disk gang assemblies 32 is coupled to the frame 20. Other tools may additionally (or alternatively) be utilized. In some embodiments, disks 34 of the forward disk gang assembly 32 are angled outward. In this way, the disks 34 may auger soil and plant matter (including residue) outward away from the centerline of the tillage implement 10. Other example configurations include adjusting an angle of the disks 34, configurations with a different number or arrangement of disk gang assemblies 32, and so on.

In some embodiments, depending on the amount or type of residue detected, one or more hydraulic cylinders 36 (or other lift devices) are coupled to the frame 20 in order to respond to move the disk gang assemblies 32 relative to the frame 20. Example adjustments include changing the disk cutting depth, a gang angle, disk angle, and so on, by adjusting the hydraulics or an electro-mechanical motor attached to the implement. The hydraulic cylinders 36 are in hydraulic (or other) communication with the controller 26, such that the controller 26 may signal the hydraulic cylinders 36 to move the disk gang assemblies 32 relative to the frame 20. In this way, controller 26 may adjust the down-pressure of the disk gang assemblies 32 on the field 14 as well as the penetration depth of the disks 34 of the disk gang assemblies 32 into the field 14. In some embodiments, activation of the hydraulic cylinders 36 by the controller 26 may result in the disk gang assemblies 32 being moved over a range of eight inches or more. Such movement of the disk gang assemblies 32 relative to the field 14 is useful with regard to residue management. For example, deeper penetration of the disks 46 into the field 14 may tend to bury more plant matter and therefore result in smaller percentage coverage of residue. Similarly, greater down-pressure of the disks 46 on the field 14 may result in a greater amount of plant material being cut by the disks 46 and, accordingly, in a smaller characteristic residue size.

Figure 1A:
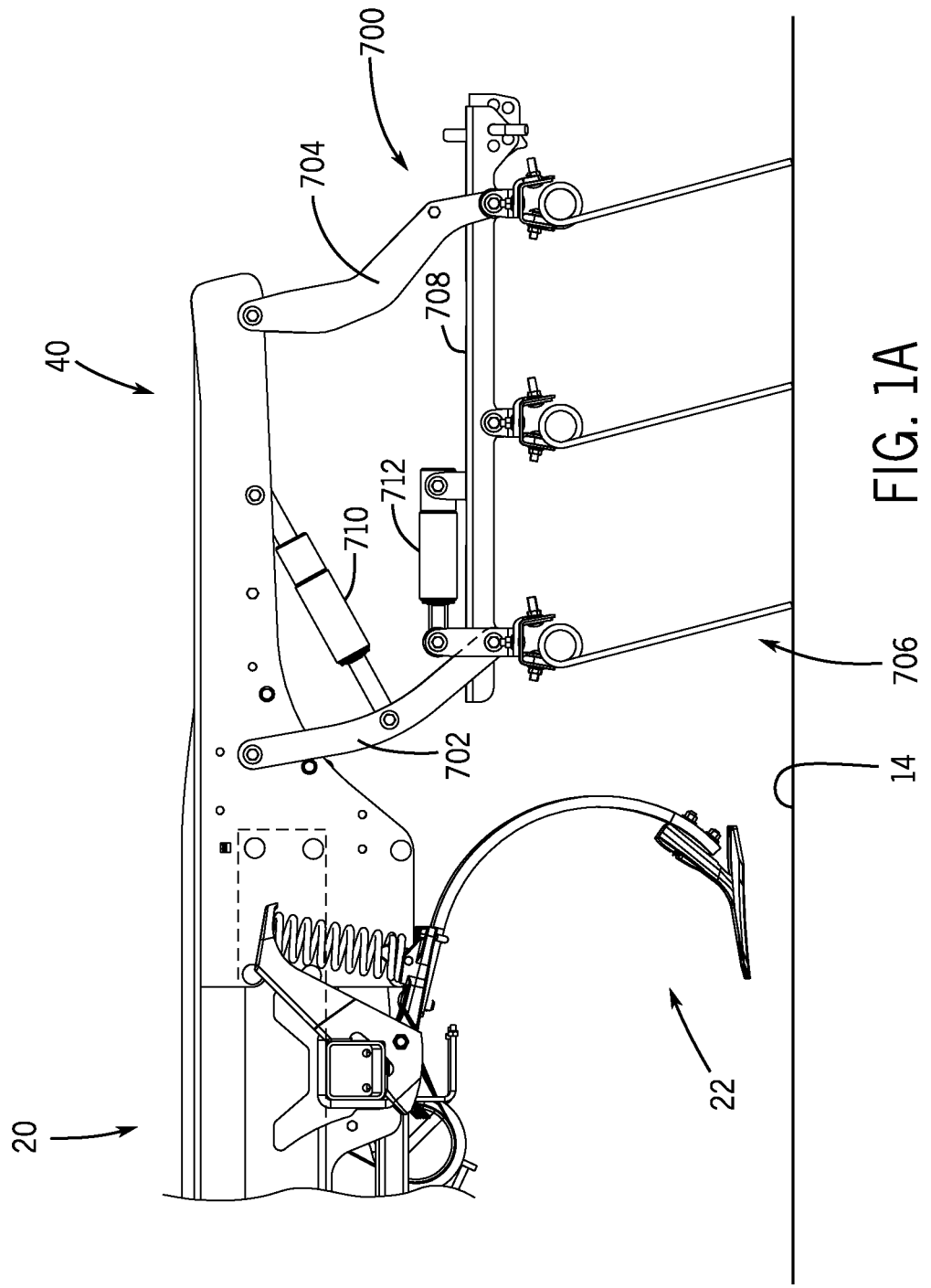
FIG. 1A is a detail view of a portion of the implement of FIG. 1.

The tillage implement 10 may also include a rear frame portion 40, which is pivotally coupled to the frame 20 (e.g., at one or more pivot points aft of the shanks 22). The rear frame portion 40 of the tillage implement 10 may also include a third set of ground engaging tools, such as a tine harrow assembly 700. With reference to FIG. 1A, the tine harrow assembly 700 is coupled to the rear frame portion 40 via a first linkage 702 and a second linkage 704. In some embodiments, one or more ground engaging tools, such as tines 706, are coupled to a harrow frame section 708. It should be noted that the use of a tine harrow assembly is merely an example, as the rear frame portion 40 may alternatively include a similarly configured spike harrow assembly.

The example harrow frame section 708 is positioned underneath the rear frame portion 40, and is pivotally coupled to the first linkage 702 and the second linkage 704. Thus, the harrow frame section 708 is movable relative to the rear frame portion 40. In some embodiments, one or more hydraulic cylinders 710 (or other lift devices) are coupled to the rear frame portion 40 and to the first linkage 702, and one or more hydraulic cylinders 712 (or other lift devices) are coupled to harrow frame section 708 and the first linkage 702. The hydraulic cylinders 710 are movable to adjust a downforce or down pressure of the tines 706 into the field 14, and hydraulic cylinders 712 are movable to adjust an angle between the tines 706 and the field 14.

The hydraulic cylinders 710, 712 are in hydraulic (or other) communication with the controller 26, such that the controller 26 may signal the hydraulic cylinders 710, 712 to pivot the first linkage 702 relative to the rear frame portion 40 and/or harrow frame section 708 relative to the second linkage 704 in order to move the tines 706 relative to the field 14. In this way, controller 26 may adjust the down-pressure of the tines 706 on the field 14 as well as the angle of the tines 706 into the field 14. Such movement of the tines 706 relative to the field 14 may be useful with regard to residue management. For example, a steeper angle of penetration for the tines 706 into the field 14 may result in a greater amount of plant material being cut by the tines 706. Similarly, a greater down-pressure of the tines 706 on the field 14 may tend to bury more plant matter and therefore result in smaller percentage coverage of residue.

Figure 2:
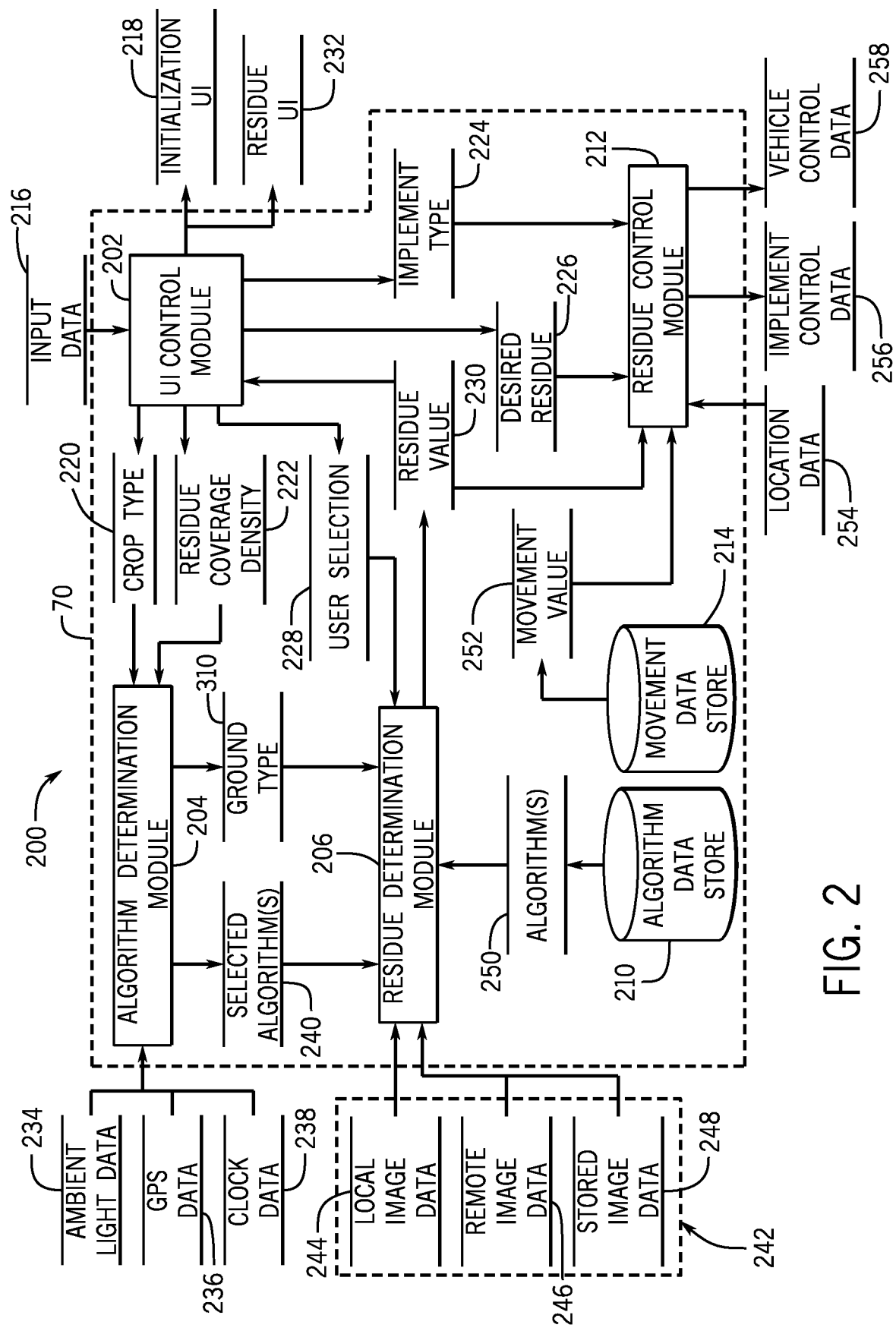
FIG. 2 is a dataflow diagram illustrating a residue detection and control system in accordance with various embodiments.

Moreover, in some embodiments, the controller 26 is operatively coupled to a controller 70 associated with the work vehicle 12. The controller 26 is responsive to one or more control signals from the controller 70 to drive the hydraulic cylinders 710, 712 to move the tines 706 such that the angle and down-pressure of the tines 706 are adjusted from within the cab 92. In this instance, a human-machine interface 104 disposed in the cab 92 of the work vehicle 12 may include one or more switches, buttons, levers, a touch-screen interface having graphical icons, etc. to enable the operator to adjust the angle and/or down-pressure of the tines 706 without leaving the cab 92. In some embodiments, the tines 706 are adjusted by the operator via the human-machine interface 104 independently or separate from a residue detection and control system 200 (FIG. 2).

In some embodiments, the hydraulic cylinders 710, 712 (or another lift device) are coupled directly to the tines 706 (or associated support components) rather than the rear frame portion and/or first linkage 702, in order to directly move individual ones of the tines 706 relative to the field 14.

In some embodiments, a fourth set of ground-engaging tools is coupled to the rear frame portion 40. For example, a closing disk assembly 42 is coupled to the rear frame portion 40. Other tools may additionally (or alternatively) be utilized. In some embodiments, one or more hydraulic cylinders 44 (or other lift devices) are coupled to the frame 20 and the rear frame portion 40. The hydraulic cylinders 44 may be in hydraulic (or other) communication with the controller 26, such that the controller 26 may signal the hydraulic cylinders 44 to pivot the rear frame portion 40 relative to the frame 20 in order to move the closing disk assembly 42 relative to the frame 20. In this way, controller 26 may adjust the depth of the disks 46 of the closing disk assembly 42 relative to the field 14. In some embodiments, activation of the hydraulic cylinders 44 by the controller 26 may result in the disks 46 being moved over a range of eight inches or more. Such movement of the disks 46 may also be useful with regard to residue management.

In some embodiments, the hydraulic cylinders 44 (or another lift device) may be coupled directly to the closing disk assembly 42 (or associated support components) rather than the rear frame portion 40, in order to directly move or adjust the closing disk assembly 42 relative to the field 14.

In some embodiments, again depending on the amount or type of residue detected, the speed of the tractor or vehicle 12 can be manually or auto-adjusted. For instance, if an operator or the central controller 26 desires less residue than the amount detected, the speed of the tractor is increased, which tends to throw more soil and thus bury more residue. If the goal is to leave more residue, then the speed of the vehicle 12 may be kept constant or even decreased to avoid burying the residue. The operator can set or program in a desired amount of residue, either at the cab console, or from a remote location.

Various other control devices and systems may be included on or otherwise associated with the tillage implement 10. For example, a depth control device 50 is mounted to the frame 20 and is in hydraulic, electronic or other communication with controller 26, and hydraulic cylinders 28, 36, 710, 712 and 44. The depth control device 50 may include various sensors (e.g., rotational sensors, potentiometers, pressure transducers, hall-effect rotational sensors, and so on) to sense indications (e.g., pressure, relative position, or combination of pressure and relative position) of the relative location (e.g., relative depth with respect to field 14, relative angle with respect to the field 14 and/or relative down-pressure with respect to the field 14) of the shanks 22, the disks 34, the tines 706, the disks 46, or various other tools (not shown). A control module (e.g., a control module included in the controller 26 or included in the controller 70 associated with the work vehicle 12) may receive signals from the various sensors associated with the depth control device 50 that may indicate a particular orientation (e.g., depth, angle, down-pressure) of shanks 22, disks 34, tines 706 or disks 46. The control module may then, using open loop, closed loop, proportional-integral-derivative "PID," or other control methodologies, determine an appropriate control signal to cause the hydraulic cylinders 28, 36, 710, 712 and 44, to adjust, respectively, the orientation the shanks 22, disks 34, tines 706 and disks 46, as appropriate. In this way, for example, the combined system of controller 26, the sensors of the depth control device 50 and the hydraulic cylinders 28, 36, 710, 712 and 44 may move the shanks 22, disks 34, tines 706 and disks 46 to, and maintain these devices at, any desired orientation.

In some embodiments, one or more location-sensing devices may also be included on or associated with the tillage implement 10 and/or work vehicle 12. For example, a GPS device 52 may use GPS technology to detect the location of the tillage implement 10 along the field 14 at regular intervals (e.g., during a tillage operation). The detected locations may then be communicated via various known means to the controller 26 and/or the controller 70 associated with the work vehicle 12. In some embodiments, the detected locations may additionally (or alternatively) be communicated to one or more remote systems. For example, GPS device 52 may wirelessly transmit location information for the tillage implement 10 to a remote monitoring system for tracking of various aspects of the operation of the tillage implement 10. In some embodiments, the GPS device 52 is mounted to tillage implement 10. In some embodiments, the GPS device 52 is mounted in other ways, including to the work vehicle 12. In example remote applications, an operator can be at his house or at a remote site (e.g. another farm), receive the monitored residue data and location information on his computer (e.g. laptop of tablet). The operator has the choice of adjusting the tillage implement 10 to respond to the amount of residue.

In some embodiments, one or more camera assemblies may also be associated with the tillage implement 10 and/or work vehicle 12. It should be noted that while the following description refers to "camera assemblies" any suitable visual sensor any be employed to obtain an imaged area of the field 14. In some embodiments, an aft camera assembly 54 is mounted to the tillage implement 10 (or otherwise positioned) in order to capture images at least of an area 56 behind the tillage implement 10 (i.e., "aft images"). In some embodiments, a forward camera assembly 58 may additionally (or alternatively) be mounted to or associated with the work vehicle 12 (or otherwise positioned) in order to capture images at least of an area 60 forward of the work vehicle 12 (i.e., "forward" images). The camera assemblies 54 and 58 may be in electronic (or other) communication with the controller 70 (or other devices) and may include various numbers of cameras of various types. In some embodiments, one or both of the camera assemblies 54 and 58 may include a color camera capable of capturing color images. In other embodiments, one or both of the camera assemblies 54 and 58 may include an infrared camera to capture infrared images. In some embodiments, one or both of the camera assemblies 54 and 58 may include a grayscale camera to capture grayscale images. In some embodiments, one or both of the camera assemblies 54 and 58 may include a stereo camera assembly capable of capturing stereo images. For example, one or both of the camera assemblies 54 and 58 may include a stereo camera with two or more lenses and image sensors, or multiple cameras arranged to capture stereoscopic images of the areas 56 and 60.

Images may be captured by camera assemblies 54 and 58 according to various timings or other considerations. In some embodiments, for example, the respective camera assemblies 54 and 58 may capture images continuously as tillage implement 10 executes a tillage (or other) operation on the field 14. In some embodiments, embedded control system (not shown) for each camera assembly 54 and 58 may cause the respective camera assemblies 54 and 58 to capture images of the areas 56 and 60, respectively, at regular time intervals as tillage implement 10 executes a tillage (or other) operation on the field 14.

In some embodiments, the timing of image capture by aft camera assembly 54 is offset from the timing of image capture by forward camera assembly 58 such that the portion of the field 14 within the image area 56 when the aft camera assembly 54 captures an image substantially overlaps with the portion of the field 14 that was within the image area 60 when the forward camera assembly 58 captured a prior image. As such, for example, the relative timing of image capture for the two camera assemblies 54 and 58 is varied by a control system (e.g., controller 70) based upon the wheel speed of tillage implement 10.

The aft camera assembly 54 and the forward camera assembly 58 provide two sources of local image data for the controller 70 associated with the work vehicle 12. Other sources of image data for the controller 70 is available. For example, a portable electronic device 62 may provide a source of image data for the controller 70 (i.e. as a source of remote image data). The portable electronic device 62 is in communication with the work vehicle 12 to transmit data to a vehicle communication device 72 associated with the work vehicle 12 and to receive the data from the vehicle communication device 72. The portable electronic device 62 is any suitable electronic device external to the work vehicle 12, including, but not limited to, a hand-held portable electronic device, such as a tablet computing device, mobile or smart phone, personal digital assistant; a laptop computing device, etc.

The portable electronic device 62 includes a device communication component 66, a device user interface 68, a mobile camera assembly 74 and a device controller or control module 76. The device communication component 66 comprises any suitable system for receiving data from and transmitting data to the vehicle communication device 72. For example, the device communication component 66 includes a radio to receive data transmitted by modulating a radio frequency (RF) signal from a remote station or remote farm field or cloud server (not shown). For example, the remote station or farm field or cloud server (not shown) is part of a cellular telephone network and the data may be transmitted according to the long-term evolution (LTE) standard. The device communication component 66 also transmits data to the remote station or farm field (not shown) to achieve bi-directional communications. However, other techniques for transmitting and receiving data may alternately be utilized. For example, the device communication component 66 may achieve bi-directional communications with the vehicle communication device 72 over Bluetooth or by utilizing a Wi-Fi standard, i.e., one or more of the 802.11 standards as defined by the Institute of Electrical and Electronics Engineers ("IEEE").

The device communication component 66 may also encode data or generate encoded data. The encoded data generated by the device communication component 66 is encrypted. A security key is utilized to decrypt and decode the encoded data. The security key is a "password" or other arrangement of data that permits the encoded data to be decrypted.

In some embodiments, portable electronic device 62 is coupled directly to the work vehicle 12 via a docking station 90 disposed within the cab 92 of the work vehicle 12. The docking station 90 is in wired or wireless communication with the controller 70 to enable the image data from the mobile camera assembly 74 to be transmitted directly to the controller 70. Thus, the docking station 90 may comprise a suitable interface, such as USB, microUSB, Apple® Lightning™, etc. that cooperates with an interface associated with the portable electronic device 62 to enable data transfer from the portable electronic device 62 to the controller 70.

The device user interface 68 allows the user of the portable electronic device 62 to interface with the portable electronic device 62. In one example, the device user interface 68 includes a user input device 78 and a display 80. The user input device 78 is any suitable device capable of receiving user input, including, but not limited to, a keyboard, a microphone, a touchscreen layer associated with the display 80, or other suitable device to receive data and/or commands from the user. Of course, multiple user input devices 78 can also be utilized. The display 80 comprises any suitable technology for displaying information, including, but not limited to, a liquid crystal display (LCD), organic light emitting diode (OLED), plasma, or a cathode ray tube (CRT).

The mobile camera assembly 74 associated with the portable electronic device 62 captures images at least of an area 74a in front of the portable electronic device 62. The mobile camera assembly 74 is in electronic (or other) communication with the device control module 76 and may include various numbers of cameras of various types. In some embodiments, mobile camera assembly 74 comprises a color camera to capture color images. It should be noted, however, that the mobile camera assembly 74 may comprise any suitable camera assembly for image capture, such as a grayscale camera, infrared camera, etc.

The device control module 76 is in communication with the device communication component 66, the device user interface 68 and the mobile camera assembly 74 over a suitable interconnection architecture or arrangement that facilitates transfer of data, commands, power, etc. The device control module 76 receives input from the device user interface 68 and sets data, such as image data from the mobile camera assembly 74, for transmission by the device communication component 66 to the work vehicle 12 based on the input from the device user interface 68. The device control module 76 may also receive data from the device communication component 66 and sets this data as output for display on the display 80 of the device user interface 68. Thus, the device control module 76 enables two way data transfer with the work vehicle 12 and may enable a user remote from the work vehicle 12 to interface with the systems of the work vehicle 12. The device control module 76 may also be configured to execute the residue detection and control system 200, as will be discussed below.

As a further alternative, the controller 70 may receive image data from various other remote sources of image data.

For example, image data is captured by a drone camera assembly 82 coupled to a drone 84 or other unmanned aerial vehicle (e.g. satellite). Image data captured by the drone camera assembly 82 is transmitted by a drone control module 86 of the drone 84 through a drone communication component 88 to the vehicle communication device 72 according to various communication protocols. The drone communication component 88 comprises any suitable system for receiving data from and transmitting data to the vehicle communication device 72. For example, the drone communication component 88 may include a radio to receive data transmitted by modulating a radio frequency (RF) signal from a remote station (not shown). For example, the remote station (not shown) is part of a cellular telephone network and the data may be transmitted according to the long-term evolution (LTE) standard. The drone communication component 88 also transmits data to the remote station (not shown) to achieve bi-directional communications. However, other techniques for transmitting and receiving data may alternately be utilized. For example, the drone communication component 88 may achieve bi-directional communications with the vehicle communication device 72 over Bluetooth or by utilizing a Wi-Fi standard.

The drone communication component 88 may also encode data or generate encoded data. The encoded data generated by the drone communication component 88 may be encrypted. A security key is utilized to decrypt and decode the encoded data. The security key may be a "password" or other arrangement of data that permits the encoded data to be decrypted. Alternatively, the image data captured by the drone camera assembly 82 is downloaded from the drone 84 via a wired connection, USB, etc., upon landing of the drone 84.

The drone camera assembly 82 associated with the drone 84 captures images at least of an area 82a in front of the drone 84. The drone camera assembly 82 is in electronic (or other) communication with the drone control module 86 and may include various numbers of cameras of various types. In some embodiments, drone camera assembly 82 comprises a color camera to capture color images. It should be noted, however, that the drone camera assembly 82 may comprise any suitable camera assembly for image capture, such as a grayscale camera, infrared camera, etc. Moreover, while the drone 84 is illustrated herein as including a single camera assembly, the drone 84 may include any number of drone camera assemblies 82, which may be mounted at any desired location on the drone 84, such as in a forward location and an aft location.

In some embodiments, the source of remote image data may comprise a satellite having one or more camera assemblies. The satellite is in communication with the vehicle communication device 72 over a suitable communication protocol to provide captured images to the controller 70. Further, a source of image data remote from the work vehicle 12 is provided by a camera assembly coupled to a ground scout or other ground based imaging device. Moreover, the ground scout or ground based imaging device may include any number and configuration of camera assemblies for capturing images of the field 14. In addition, while the controller 70 is described herein as receiving image data from one or more camera assemblies 54, 58, 74, 82, the controller 70 may receive image data from any suitable visual sensor, and the use of the one or more camera assemblies 54, 58, 74, 82 is merely an example.

The work vehicle 12 includes a source of propulsion, such as an engine 94. The engine 94 supplies power to a transmission 96. The transmission 96 transfers the power from the engine 94 to a suitable driveline coupled to one or more driven wheels 98 (and tires) of the work vehicle 12 to enable the work vehicle 12 to move. In one example, the engine 94 is an internal combustion engine that is controlled by an engine control module 94a. As will be discussed further herein, the engine control module 94a receives one or more control signals or control commands from the controller 70 to adjust a power output of the engine 94. It should be noted that the use of an internal combustion engine is merely example, as the propulsion device can be a fuel cell, electric motor, a hybrid-electric motor, etc., which is responsive to one or more control signals from the controller 70 to reduce a power output by the propulsion device.

The work vehicle 12 also includes one or more pumps 100, which may be driven by the engine 94 of the work vehicle 12. Flow from the pumps 100 is routed through various control valves 102 and various conduits (e.g., flexible hoses) to the controller 26 in order to drive the hydraulic cylinders 28, 36, 710, 712 and 44. Flow from the pumps 100 may also power various other components of the work vehicle 12. The flow from the pumps 100 is controlled in various ways (e.g., through control of the various control valves 102 and/or the controller 26), in order to cause movement of the hydraulic cylinders 28, 36, 710, 712 and 44, and thus, the shanks 22, disks 34, tines 706 and disks 46 of the tillage implement 10. In this way, for example, a movement of a portion of the tillage implement 10 is implemented by various control signals to the pumps 100, control valves 102, controller 26 and so on.

The central controller 70 (or multiple controllers) controls various aspects of the operation of the work vehicle 12. The controller 70 (or others) includes a computing device with associated processor devices and memory architectures, a hard-wired computing circuits, a programmable circuit, a hydraulic, electrical or electro-hydraulic controller, or otherwise. As such, the controller 70 may execute various computational and control functionality with respect to the work vehicle 12 (or other machinery). In some embodiments, the controller 70 receives input signals in various formats (e.g., as hydraulic signals, voltage signals, current signals, and so on), and to transmit or output command signals in various formats (e.g., as hydraulic signals, voltage signals, current signals, mechanical movements, and so on). In some embodiments, the controller 70 (or a portion thereof) is an assembly of hydraulic components (e.g., valves, flow lines, pistons and cylinders, and so on), such that control of various devices (e.g., pumps or motors) is effected with, and based upon, hydraulic, mechanical, or other signals and movements.

In some embodiments, the controller 70 is in electronic, hydraulic, mechanical, or other communication with various other systems (e.g. cloud server, remote computers) or devices of the work vehicle 12 (or other machinery, such as the tillage implement 10). For example, the controller 70 is in electronic or hydraulic communication with various actuators, sensors, and other devices within (or outside of) the work vehicle 12, including various devices associated with the pumps 100, control valves 102, controller 26, sensors of the depth control device 50, GPS device 52, and so on. The controller 70 may communicate with other systems or devices (including other controllers, such as the controller 26) in various known ways, including via a CAN bus (not shown) of the work vehicle 12, via wireless or hydraulic communication means, or otherwise. An example location for the controller 70 is depicted in FIG. 1. Other locations are possible including other locations on the work vehicle 12, or various remote locations. For example, the controller 70 is implemented on the portable electronic device 62.

In some embodiments, the controller 70 receives input commands and to interface with an operator via the human-machine interface 104, which is disposed inside the cab 92 of the work vehicle 12 for easy access by the operator. The human-machine interface 104 may be configured in a variety of ways. In some embodiments, the human-machine interface 104 includes one or more joysticks, various switches or levers, one or more buttons, a touchscreen interface that is overlaid on a display 106, a keyboard, a speaker, a microphone associated with a speech recognition system, or various other human-machine interface devices.

Various sensors may also be provided to observe various conditions associated with the work vehicle 12 and/or the tillage implement 10. In some embodiments, various sensors 108 (e.g., pressure, flow or other sensors) is disposed near the pumps 100 and control valves 102, or elsewhere on the work vehicle 12. For example, sensors 108 may comprise one or more pressure sensors that observe a pressure within the hydraulic circuit, such as a pressure associated with at least one of the one or more hydraulic cylinders 28, 36, 710, 712 and 44. The sensors 108 may also observe a pressure associated with the pumps 100. In some embodiments, various sensors may be disposed near the cab 92. For example, sensors 110 (e.g. ambient condition sensors) may be disposed on or coupled near the cab 92 in order to measure parameters including an amount of ambient light the work vehicle 12 is exposed to and so on. The work vehicle 12 may also include a clock 112 in order to inform the residue detection and control system and method described herein.

The vehicle communication device 72 enables communication between the controller 70 and the portable electronic device 62 and/or the drone 84. The vehicle communication device 72 comprises any suitable system for receiving data from and transmitting data to the portable electronic device 62 and/or the drone 84. For example, the vehicle communication device 72 may include a radio configured to receive data transmitted by modulating a radio frequency (RF) signal from a remote station (not shown). For example, the remote station (not shown) is part of a cellular telephone network and the data is transmitted according to the long-term evolution (LTE) standard. The vehicle communication device 72 also transmits data to the remote station (not shown) to achieve bi-directional communications. However, other techniques for transmitting and receiving data may alternately be utilized. For example, the vehicle communication device 72 may achieve bi-directional communications with the portable electronic device 62 and/or the drone 84 over Bluetooth or by utilizing a Wi-Fi standard, i.e., one or more of the 802.11.

In some embodiments, the vehicle communication device 72 is configured to encode data or generate encoded data. The encoded data generated by the vehicle communication device 72 is encrypted. A security key is utilized to decrypt and decode the encoded data. The security key is a "password" or other arrangement of data that permits the encoded data to be decrypted. Alternatively, the remote station (not shown) may implement security protocols to ensure that communication takes place between the appropriate work vehicles 12 and portable electronic device 62 and/or the drone 84. The vehicle communication device 72 may also be in communication with the satellite, ground scout and ground based imaging devices over various communication protocols to acquire image data.

The various components noted above (or others) may be utilized to detect residue and control the tillage implement 10 via control of the movement of the one or more hydraulic cylinders 28, 36, 710, 712 and 44, and thus, the shanks 22, disks 34, tines 706 and disks 46, and/or the engine 94 of the work vehicle 12. Accordingly, these components may be viewed as forming part of the residue detection and control system for the work vehicle 12 and/or tillage implement 10. Each of the sensors of the depth control device 50, GPS device 52, sensors 108 and 110 and the clock 112 may be in communication with the controller 70 via a suitable communication architecture.

In various embodiments, the controller 70 outputs one or more control signals to the hydraulic cylinders 28, 36, 710, 712 and 44 to move the shanks 22, disks 34, tines 706 and disks 46 associated with the tillage implement 10 based on one or more of the sensor signals received from the sensors of the depth control device 50, GPS device 52, sensors 108 and 110, input received from the human-machine interface 104, image data received from one or more of the camera assemblies 54, 58, 74, 82 and further based on the residue detection and control systems and methods of the present disclosure. The controller 70 outputs the one or more control signals to the pumps 100 and/or control valves 102 associated with hydraulic cylinders 28, 36, 710, 712 and 44 to move the shanks 22, disks 34, tines 706 and disks 46 of the tillage implement 10 based on one or more of the sensor signals received from the sensors of the depth control device 50, GPS device 52, sensors 108 and 110, input from the clock 112, image data from the camera assemblies 54, 58, 74, 82, and input received from the human-machine interface 104. In some embodiments, the controller 70 outputs the one or more control signals to the engine control module 94a to reduce a speed of the engine 94 based on one or more of the sensor signals received from the sensors of the depth control device 50, GPS device 52, sensors 108 and 110, input from the clock 112, image data from the camera assemblies 54, 58, 74, 82 and input received from the human-machine interface 104. By controlling the hydraulic cylinders 28, 36, 710, 712 and 44 to move the shanks 22, disks 34, tines 706 and disks 46 of the tillage implement 10, a value of residue remaining on the field 14 is controlled within a desired range. Moreover, by reducing a speed of the engine 94 associated with the work vehicle 12, the tillage implement 10 may till the field 14 at a slower pace, which may also reduce an amount of residue coverage remaining on the field 14 after a tillage operation is performed by the tillage implement 10.

Referring now to FIG. 2, and with continued reference to FIG. 1, a dataflow diagram illustrates various embodiments of the residue detection and control system 200 for the work vehicle 12, which is embedded within the controller 70. It should be noted, however, that the residue detection and control system 200 may also be embedded within the device control module 76, if desired. Stated another way, the residue detection and control system 200 is embedded within the device control module 76, such that the residue detection and control system 200 is executed on the portable electronic device 62. In certain instances, the residue detection and control system 200 may comprise an application or "app," which is executed by the device control module 76 based on the receipt of user input via the user input device 78.

Various embodiments of the residue detection and control system 200 according to the present disclosure can include any number of sub-modules embedded within the controller 70 and/or device control module 76. As can be appreciated, the sub-modules shown in FIG. 2 can be combined and/or further partitioned to similarly control the hydraulic cylinders 28, 36, 710, 712 and 44 for moving the shanks 22, disks 34, tines 706 and disks 46 of the tillage implement 10 and to control the speed of the work vehicle 12 via the engine control module 94a. Inputs to the residue detection and control system 200 may be received from the sensors of the depth control device 50, GPS device 52, sensors 108 and 110 (FIG. 1), received from the camera assemblies 54, 58, 74, 82, received from the human-machine interface 104 (FIG. 1), received from other control modules (not shown) associated with the work vehicle 12 and/or tillage implement 10, and/or determined/modeled by other sub-modules (not shown) within the controller 70 and/or device control module 76. In various embodiments, the controller 70 includes a user interface (UI) control module 202, a method determination module 204, a residue determination module 206, a stored image data store 208, a method data store 210, a residue control module 212 and a movement data store 214.

The UI control module 202 receives input data 216 from the human-machine interface 104. The input data 216 comprises one or more user inputs to an initialization user interface 218, for example. The initialization user interface 218 comprises one or more graphical or textual interfaces for display on the display 106, which cooperates with the human-machine interface 104 to enable the user to customize the settings for the residue detection and control system 200. For example, the initialization user interface 218 may include one or more prompts, graphical icons, buttons, text boxes, etc. that enable the operator to enter a type of crop on the field 14, a coverage density for the residue on the field 14, a type of implement attached to the work vehicle 12, a desired amount of residue coverage on the field 14 and to select one or more image processing instruction set for detecting the value of residue coverage on the imaged area of the field 14. The initialization user interface 218 may also comprise one or more prompts, graphical icons, buttons, text boxes, etc. that enable the operator to search through stored images of the field 14 and stored in a suitable memory associated with the controller 70 and/or device control module 76, and to select a stored image for processing by the residue determination module 206.

The UI control module 202 interprets the input data 216, and sets a crop type 220 and a residue coverage density value 222 for the method determination module 204. The UI control module 202 also interprets the input data 216 and sets an implement type 224 and a desired residue value 226 for the residue control module 212. The UI control module 202 interprets the input data 216 and sets a user selection 228 for the residue determination module 206. The crop type 220 comprises the type of crop on the field 14, such as corn, soybeans, lettuce, wheat, etc. The residue coverage density value 222 comprises an amount of residue on the field 14, as observed by the operator. In one example, the residue coverage density value 222 may comprise a percentage of residue covering the field 14 or other numeral value associated with an amount of residue covering the field 14. The implement type 224 comprises the type of implement, such as the tillage implement 10, primary tillage instrument, secondary tillage instrument, etc., coupled to the work vehicle 12. The desired residue value 226 comprises the desired value corresponding to residue coverage in the imaged area of the field 14, as entered by the operator. Stated another way, the desired residue value 226 may comprise an acceptable range, such as a minimum amount and a maximum amount, for residue coverage to remain on the field after a tillage operation by the tillage implement 10. Alternatively, the desired residue value 226 may comprise a pre-mapped image of the field 14, which indicates the desired amount of residue coverage to remain on various portions of the field after the tillage operation by the tillage implement 10. The user selection 228 comprises a selection from the operator of one or more image processing methods to use to detect a value that corresponds to residue coverage in an imaged area of the field 14. In some embodiments, the UI control module 202 may also interpret the input data 216 and set a harrow adjustment value for the residue control module 212. The harrow adjustment value may comprise an amount of an adjustment for the angle and/or down-pressure of the tines 706.

The UI control module 202 also receives as input a residue value 230. The residue value 230 indicates a value corresponding to residue coverage in an imaged area of the field 14. In some embodiments, the residue value 230 is a percentage of residue coverage in the imaged area of the field 14, and in other embodiments, the residue value 230 comprises a classification of the residue coverage, an indication of the size of the residue or any other suitable scale for classifying an amount of residue coverage in an imaged area of the field 14. Based on the receipt of the residue value 230, the UI control module 202 outputs a residue user interface 232 to the human-machine interface 104. The residue user interface 232 comprises a graphical user interface for display on the display 106 that indicates the value corresponding to residue coverage in the imaged area of the field 14. For example, the residue user interface 232 may comprise a textual message such as "Residue: X," in which X is the residue value 230. In addition, the residue user interface 232 may also include the imaged area of the field (or image data 242) along with the residue value 230.

In some embodiments, the UI control module 202 may also output a harrow user interface. The harrow user interface may include one or more graphical or textual interfaces for display on the display 106, which cooperates with the human-machine interface 104 to enable the user to adjust the angle and/or down-pressure of the tines 706 from the cab 92 of the work vehicle 12. In one example, the harrow user interface may include one or more graphical icons, buttons, text boxes, etc. that enable the operator to enter a value for an adjustment of the tine angle and/or a value for the adjustment of the down-pressure.

The method determination module 204 receives as input the crop type 220, the residue coverage density value 222, ambient light data 234, GPS data 236 and clock data 238. The ambient light data 234 comprises sensor data or sensor signals from the sensors 110, which comprises an amount of ambient light the cab 92 is exposed to. The method determination module 204 interprets the ambient light data 234 and determines whether the ambient light data 234 is above a threshold for ambient light. In one example, the threshold comprises a value that indicates that the cab 92 of the work vehicle 12 is exposed to full sunlight. The GPS data 236 comprises sensor data or sensor signals from the GPS device 52, which indicates a geographical location for the work vehicle 12 and/or tillage implement 10. It should be noted that the GPS data 236 need not be from the GPS device 52, but the GPS data 236 may also be received from the image data captured by the mobile camera assembly 74 of the portable electronic device 62, for example. The clock data 238 comprises a signal from the clock 112, which indicates a time of day.

Based on the crop type 220, the residue coverage density value 222, the ambient light data 234, the GPS data 236 and the clock data 238, the method determination module 204 sets one or more selected image processing methods 240 for the residue determination module 206. In this regard, with reference to FIG. 3, and with continued reference to FIG. 1, a dataflow diagram illustrates various embodiments of a method selection control system 300 for the work vehicle 12, which may be embedded within the method determination module 204. Various embodiments of the method selection control system 300 according to the present disclosure can include any number of sub-modules embedded within the controller 70 and/or device control module 76. As can be appreciated, the sub-modules shown in FIG. 3 can be combined and/or further partitioned to similarly select the image processing method(s) for processing the imaged area of the field 14. Inputs to the method selection control system 300 may be received from the sensors of the depth control device 50, GPS device 52, sensors 108 and 110 (FIG. 1), received from the human-machine interface 104 (FIG. 1), received from other control modules (not shown) associated with the work vehicle 12 and/or tillage implement 10, and/or determined/modeled by other sub-modules (not shown) within the controller 70 and/or device control module 76. In various embodiments, the method determination module 204 includes an environmental contrast determination module 302, a region data store 304, a method selection module 306 and a method tables data store 308.

The region data store 304 stores one or more tables (e.g., lookup tables) that indicate a type of soil or ground associated with a geographical location. In other words, the region data store 304 stores one or more tables that provide a ground type 310 for the field 14 based on the geographical location of the work vehicle 12 and/or tillage implement 10. In some embodiments, the ground type 310 may indicate a color associated with a soil found in the geographical location. The one or more tables may comprise calibration tables, which are acquired based on experimental data. In various embodiments, the tables may be interpolation tables that are defined by one or more indexes. As an example, one or more tables can be indexed by various parameters such as, but not limited to, geographical location, to provide the ground type 310. It should be noted that the use of the region data store 304 is merely example, as the ground type 310 is received via input data 216 to the human-machine interface 104 in embodiments where GPS data 236 is unavailable.

The environmental contrast determination module 302 receives as input the crop type 220 and the GPS data 236. Based on the GPS data 236, the environmental contrast determination module 302 queries the region data store 304 and retrieves the ground type 310 that corresponds with the geographical region in the GPS data 236. The ground type 310 may also be set for the residue determination module 206. Based on the crop type 220 and the ground type 310, the environmental contrast determination module 302 determines an environmental contrast value 312. The environmental contrast value 312 comprises an amount of contrast between the crop on the field 14 and the ground of the field 14 itself. Stated another way, the environmental contrast value 312 comprises a value that indicates a contrast in color between the crop (and thus, the residue from the crop) and the soil of the ground of the field 14. The environmental contrast value 312 may comprise any suitable indicator of a contrast value, such as 1 to 100, with 1 being low contrast and 100 being high contrast. For example, with the crop type 220 of corn, and the ground type 310 of black, the environmental contrast value 312 may be about 75 or more (high contrast between crop color and ground/soil color). As a further example, with the crop type 220 of corn and the ground type 310 of red, the environmental contrast value 312 is about 25 to about 75 (medium contrast value). In another example, with the crop type 220 of soybeans and the ground type 310 of light brown, the environmental contrast value 312 is about 1 to about 25 (low contrast value). The method selection control system 300 sets the environmental contrast value 312 for the method selection module 306.

The method tables data store 308 have one or more tables (e.g., lookup tables) that indicate one or more image processing instructions or instruction sets to select for processing an image of the field 14 based on the environmental contrast value 312, the ambient light data 234, the clock data 238 and the residue coverage density value 222. In other words, the method tables data store 308 contain tables that provide one or more selected image processing instruction sets 240 for processing an imaged area of the field 14 based on environmental factors. The one or more tables may comprise calibration tables, which are acquired based on experimental data. As an example, one or more tables can be indexed by various parameters such as, but not limited to, environmental contrast value, amount of ambient light, time of day and residue contrast density, to provide the selected image processing instruction sets 240 for processing the image data. It should be noted that the one or more tables may also be indexed based on other environmental factors associated with the field 14, such as residue size, residue shape, etc. to enable selection of an appropriate image processing instruction set.

The method selection module 306 receives as input the environmental contrast value 312, the ambient light data 234, the clock data 238 and the residue coverage density value 222. The crop type 220, the residue coverage density value 222, the GPS data 236, the ambient light data 234, the clock data 238 and the ground type 310 comprise environmental data, which indicates environmental factors associated with the field 14. Based on the environmental data, the method selection module 306 queries the method tables data store 308 to retrieve the selected method(s) 240. The selected method(s) 240 are set for the residue determination module 206. The method selection module 306 may retrieve one or more image processing methods based on the environmental factors. The retrieved one or more image processing methods is executed by the residue determination module 206 in series or in parallel to arrive at the residue value 230. Moreover, the method selection module 306 may retrieve a single one of the one or more image processing methods, and thus, while one or more of the image processing methods may be described herein as being executed in series, the image processing methods are selected independently based on various environmental factors associated with the field 14.

With reference to FIG. 2, the method data store 210 stores the image processing methods 250 for processing an imaged area of the field 14. Thus, the method data store 210 corresponds with the method tables data store 308 such that the selected image processing methods 240 are contained as image processing methods 250 within the method data store 210 so that the residue determination module 206 may retrieve the one or more image processing methods based on the selected image processing methods 240 to process image data. In one example, the method tables data store 308 stores the following image processing methods 250: a thresholding image processing method, a morphological image processing method, a color based classification image processing method, an automatic marker color classification image processing method, a region merging image processing method and a watershed segmentation image processing method. It should be noted that the above listed image processing methods are merely example, as the image processing methods 250 and the method tables data store 308 may comprise any number of image processing methods capable of processing an image to determine a residue coverage.

The example thresholding image processing method provides instructions or a method for processing image data in which each pixel in the image data is replaced with a black pixel if an intensity of the pixel is less than a threshold or replaced with a white pixel if the intensity is greater than a threshold. Thus, the thresholding image processing method results in a black and white image, in which the ground or soil is represented by black pixels and the residue is represented by white pixels.

The example morphological image processing method provides instructions or a method for processing image data in which the image data is eroded with a structuring element to remove a layer of pixels from inner and outer regions of pixels to result in an eroded image in which small residue is removed. The morphological image processing method dilates the eroded image with a structuring element to create a dilated image, in which the remaining residue is diluted back to its original shape. The thresholding image processing method processes the diluted image to arrive at a black and white image, in which the ground or soil is represented by black pixels and the residue is represented by white pixels. Thus, in some embodiments, the morphological image processing method is used in conjunction with the thresholding image processing method to process the image data.

The example color based classification image processing method provides instructions or a method for processing image data in which each pixel in the image data is classified based on color. In the color based classification image processing method, pixels with the same color are grouped together to differentiate between soil/ground and residue. Each pixel is assigned a number (intensity), and the difference between the numbers distinguishes the soil/ground from the residue.

The example automatic marker color classification image processing method provides instructions or a method for processing image data in which each pixel is grouped with other pixels based on similar colors. The automatic marker color classification image processing method converts the light colored pixels to white pixels and the dark colored pixels to black pixels. The white pixels represent residue, and the black pixels represent soil/ground.

The example region merging image processing method provides instructions or a method for processing image data in which similar regions in the image data are merged based on color, color intensity and geometry. The region merging image processing method results in regions in the image data of similar pixels, which are analyzed based on shape. For example, the region merging image processing method may analyze the regions for a rectangular shape as most residue can be resolved into a rectangle.

The example watershed segmentation image processing method provides instructions or a method for processing image data in which areas in the image data are flooded one surface at a time to leave boundaries and peaks. The areas remaining in the image data after the image is flooded are segmented into soil, rock and residue. In certain instances, the areas may be flooded based on color intensity, in which areas with a great color intensity (e.g. residue) are elevated as compared to areas of low color intensity (e.g. ground/soil). As ground/soil is flat in color intensity and in elevation after the flooding of the image data, the remaining elevated regions are rock and/or residue. The watershed segmentation image processing method converts the remaining elevated regions to grayscale and determines the residue from the resultant grayscale image. For example, residue is represented by a light or white pixel, with soil and rock represented by a gray or black pixel.

The residue determination module 206 receives as input the selected image processing methods 240 and the ground type 310. The residue determination module 206 also receives as input image data 242 from a source of image data. The image data 242 comprises an imaged area of the field 14, which contains residue. In some embodiments, the image data 242 comprises local image data 244 received from the aft camera assembly 54 and the forward camera assembly 58. In this example, the imaged area of the field 14 comprises the areas 56 and 60, respectively. In this example, the local image data 244 may also comprise a feedback image, or an image taken from the aft camera assembly 54 that provides an imaged area of the field 14 after tillage by the tillage implement 10. The feedback image provided by the local image data 244 may assist in substantially real-time adjustments of the tillage implement 10 to control the residue coverage in the field 14.

In other embodiments, the image data 242 comprises remote image data 246 received from the mobile camera assembly 74 and/or the drone camera assembly 82. In this example, the imaged area of the field 14 comprises the areas 74a and 82a, respectively. The image data 242 may also comprise stored image data 248, which may be received from an image data store associated with the controller 70 and/or the portable electronic device 62. The stored image data 248 comprises a previously captured image of the field 14, which is saved in memory or in a suitable data store of the controller 70 and/or the portable electronic device 62.

In some embodiments, the residue determination module 206 processes a single image at a time to determine the residue value 230. Thus, in certain examples, while the residue determination module 206 may receive a substantially real-time feed of image data (such as local image data 244), the residue determination module 206 may select a single image frame from the live stream to process for the determination of the residue value 230.

The residue determination module 206 also receives as input the user selection 228, which comprises one or more operator selected image processing method for processing the image data 242 as received from the human-machine interface 104. The user selection 228 may comprise a single one of the available image processing methods or may comprise more than one or all of the available image processing methods. Based on the user selection 228 or the selected image processing methods 240, the image data 242 and optionally the ground type 310, the residue determination module 206 processes the image data 242 based on the selected image processing method to determine the residue value 230. The example residue determination module 206 processes the image data 242 in accordance with the user selection 228 when provided instead of the selected image processing methods 240. In this regard, the user selection 228 enables the residue detection and control system 200 to operate in a "manual" mode, in which the image processing methods are manually selected by the operator in contrast to an "automatic" mode, in which the residue detection and control system 200 selects the image processing methods automatically via the method determination module 204.

In the example of the thresholding image processing method, the morphological image processing method and the automatic marker color classification image processing method, the residue value 230 may be a number or a percentage of white pixels (residue) to black pixels (soil). It should be noted that this is merely an example determination for the residue value 230 based on the thresholding image processing method, the morphological image processing method and the automatic marker color classification image processing method, as the residue value 230 may comprise the ratio of residue pixels to total pixels, etc. In the example of the color based classification image processing method, the residue value 230 comprises a number or percentage of pixels that are of a different numerical value than the numerical value associated with the ground type 310. In the region merging image processing method, the residue value 230 comprises a number or percentage of regions having a similar shape when compared to the remainder of the image in the image data 242. In the example of the watershed segmentation image processing method, the residue value 230 comprises a number or percentage of light or white pixels (residue) to gray or dark pixels (soil). The residue determination module 206 sets the residue value 230 for the UI control module 202 and for the residue control module 212.

The movement data store 214 stores one or more tables (e.g., lookup tables) that indicate a movement of the hydraulic cylinders 28, 36 and 44 to achieve a desired amount of residue coverage on the field 14 based on the current value of residue coverage on the field 14 and the type of implement. In other words, the movement data store 214 stores one or more tables that provide an amount of hydraulic fluid to be applied to the hydraulic cylinders 28, 36, 710, 712 and 44 from the pumps 100 and/or the control valves 102 based on the desired residue value 226 and the implement type 224. The one or more tables comprise calibration tables, which are acquired based on experimental data. In various embodiments, the tables are interpolation tables that are defined by one or more indexes. A movement value 252 provided by at least one of the tables indicates an amount of hydraulic fluid to be applied to the hydraulic cylinders 28, 36, 710, 712 and 44 by the pumps 100 and/or the control valves 102 to adjust, in the example of the tillage implement 10, the orientation the shanks 22, disks 34, tines 706 and disks 46. As an example, one or more tables are associated with each implement type 224 and can be indexed by various parameters such as, but not limited to, current position of the hydraulic cylinders 28, 36, 710, 712 and 44 and the difference between the current residue value and the desired residue value, to provide the movement value 252.

The residue control module 212 receives as input the desired residue value 226, the implement type 224, the residue value 230 and location data 254. The location data 254 comprises sensor data or sensor signals from the sensors of the depth control device 50, which indicate a current position or relative location (e.g., relative depth with respect to field 14) of the shanks 22, the disks 34, and the disks 46, or various other tools (not shown) associated with the implement type 224. The location data 254 also comprises sensor data or sensor signals from the sensors of the depth control device 50, which indicate a current position or relative location (e.g., relative down-pressure and/or angle with respect to field 14) of the tines 706.

Based on the desired residue value 226 and the residue value 230, the residue control module 212 determines a difference between the desired residue value 226 and the residue value 230. If the difference is within a range, for example, within about ±10% of the desired residue value 226, the residue control module 212 does not output one or more control signals to adjust the tillage implement 10 and/or the work vehicle 12. If the residue control module 212 determines the difference is outside of the range, the residue control module 212 queries the movement data store 214 to retrieve a movement value 252 for the hydraulic cylinders 28, 36, 710, 712 and 44 based on the implement type 224, the location data 254 and the difference. Based on the movement value 252, the residue control module 212 outputs implement control data 256, which comprises one or more control signals for the pumps 100, the control valves 102 and/or the controller 26 to drive the hydraulic cylinders 28, 36, 710, 712 and/or 44 to move the shanks 22, disks 34, tines 706 and/or disks 46 of the tillage implement 10 to achieve the desired residue value 226.

In some embodiments, based on the determination that the difference is outside of the range by a threshold amount, such as greater than about ±25%, the residue control module 212 may also output vehicle control data 258, which comprises one or more control signals for the engine control module 94a to adjust or reduce the speed of the engine 94, and thus, the work vehicle 12. By reducing the speed of the work vehicle 12, the tillage implement 10 may more thoroughly manipulate or till the field 14, thereby reducing the residue coverage on the field 14. The residue control module 212 may output one or both of the implement control data 256 and the vehicle control data 258 based on the difference between the desired residue value 226 and the residue value 230.

In some embodiments, the residue control module 212 may receive as input the harrow adjustment value from the UI control module 202. Based on the harrow adjustment value and the location data 254, the residue control module 212 queries the movement data store 214 and retrieves the movement value 252. Based on the movement data 252, the residue control module 212 outputs the implement control data 256, which comprises one or more control signals for the pumps 100, the control valves 102 and/or the controller 26 to drive the hydraulic cylinders 710 and/or 712 to move the tines 706 of the tillage implement 10 to achieve the desired harrow adjustment value.

Figure 3:
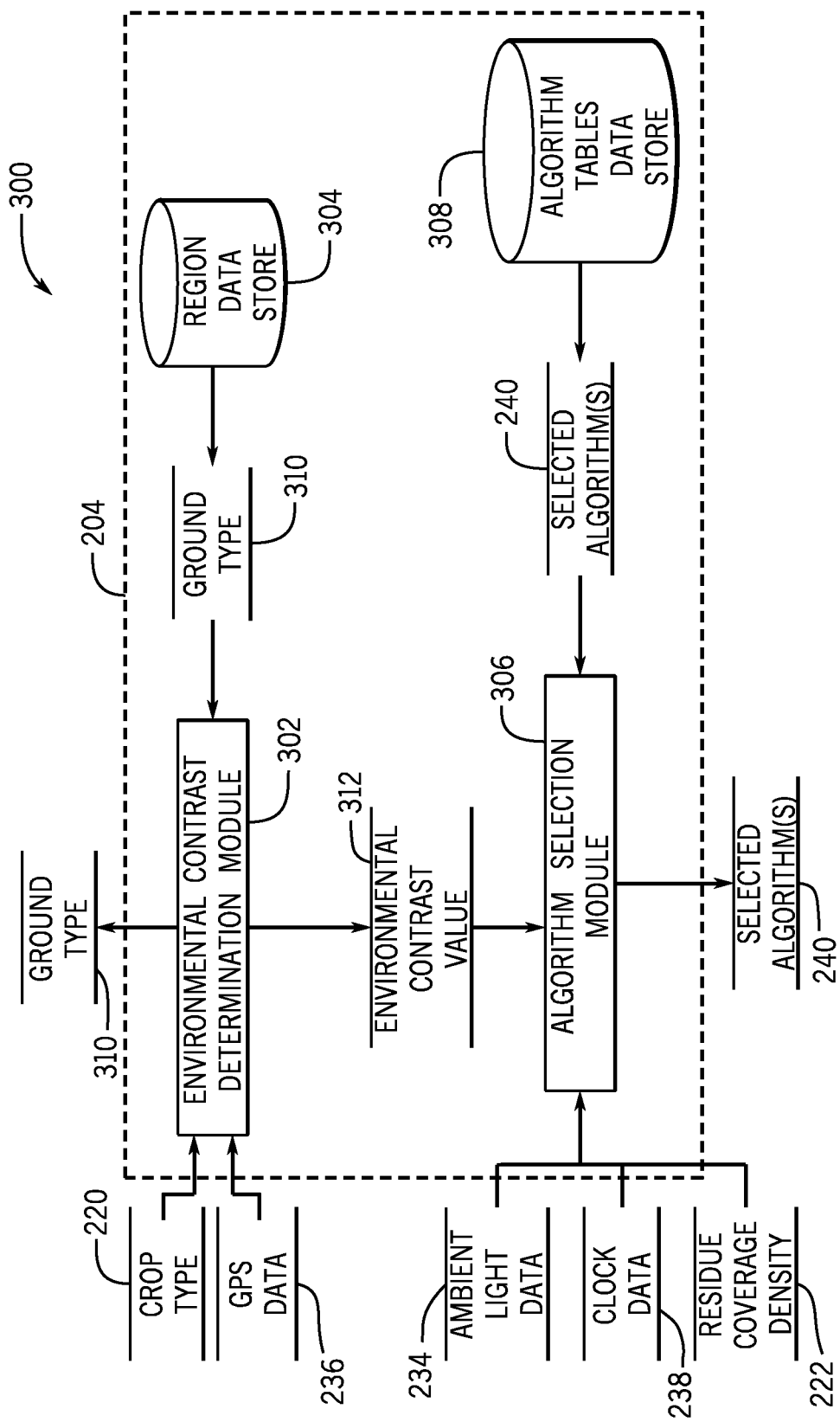
FIG. 3 is a dataflow diagram illustrating an image processing method selection control system in accordance with various embodiments.
Figure 4:
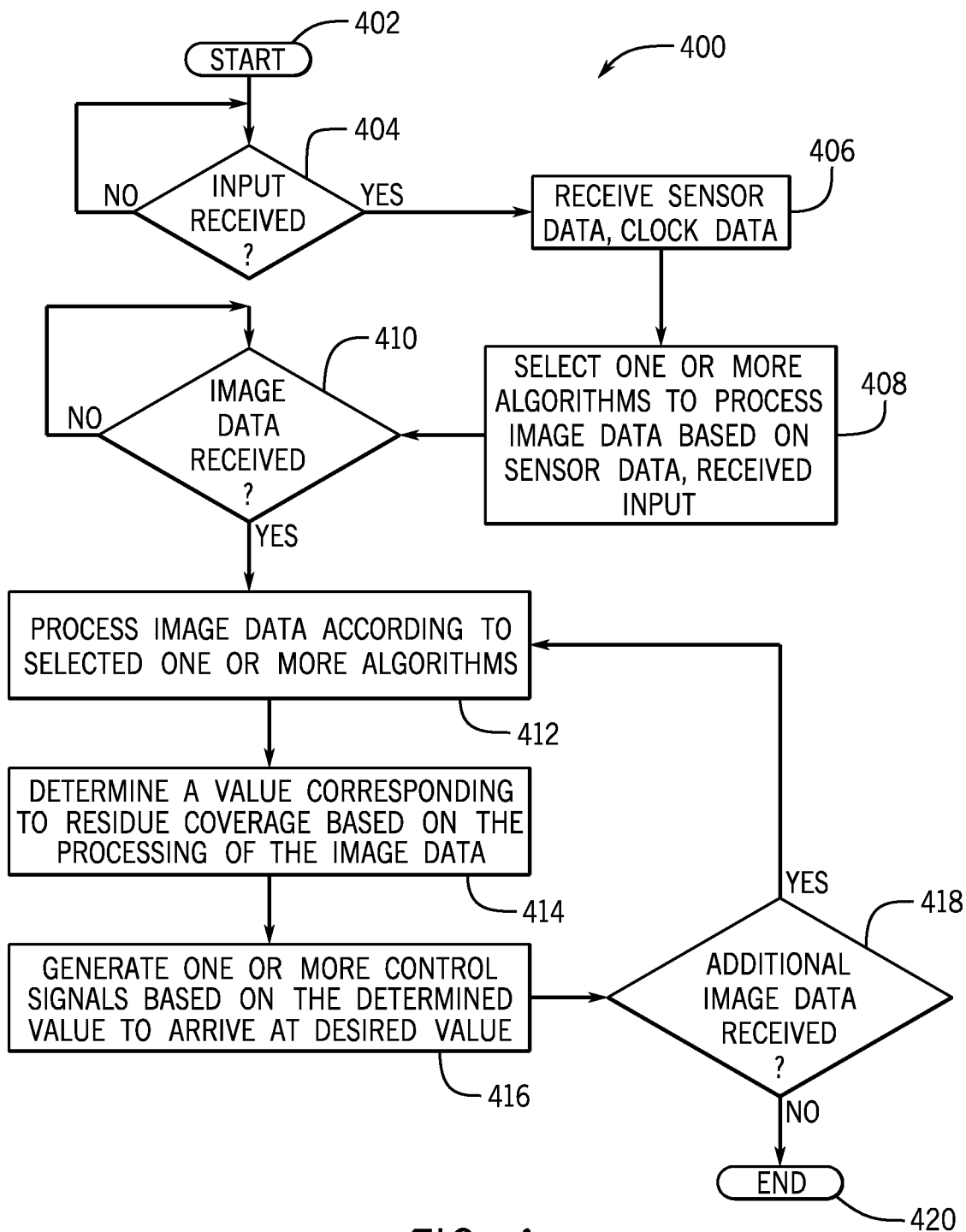
FIG. 4 is a flowchart illustrating a control method of the disclosed residue detection and control system of FIG. 1 in accordance with various embodiments.

Referring now to FIG. 4, and with continued reference to FIGS. 1-3, a flowchart illustrates a control method 400 that is performed by the controller 70 and/or device control module 76 of FIGS. 1-3. The order of operation within the method is not limited to the sequential execution as illustrated in FIG. 4, but may be performed in one or more varying orders as applicable.

In various embodiments, the method is scheduled to run based on predetermined events, and/or can run based on the receipt of input data 216. In one example, with reference to FIG. 4, the method begins at 402. At 404, the method determines whether the input data 216 has been received, such as one or more inputs to the initialization user interface 218. Based on the receipt of the input data 216, the method proceeds to 406. Otherwise, the method continues to determine whether the input data 216 has been received. At 406, the method receives sensor data, such as ambient light data 234 and GPS data 236, and clock data 238. At 408, the method selects one or more of the image processing methods based on the sensor data (ambient light data 234 and GPS data 236) and the input data 216. In one example, with reference to FIG. 5, a flowchart illustrates a control method 500 for selecting the one or more image processing methods that are performed by the controller 70 and/or the device control module 76 of FIGS. 1-3 in accordance with the present disclosure. It should be noted that the control method 500 is merely an example of a control method for selecting the one or more image processing methods. In this regard, the controller 70 and/or the device control module 76 may select one or more of the image processing methods based on any combination of environmental factors, such as the crop type 220, the residue coverage density value 222, the GPS data 236, the ambient light data 234, the clock data 238 and the ground type 310, and further, the controller 70 and/or the device control module 76 may select one or more of the image processing methods based on other factors associated with the field 14, such as residue size, residue shape, etc. which may be received as input to the initialization user interface 218 (FIG. 2). Moreover, while the control method 500 illustrated in FIG. 5 indicates a single selection of an image processing method, the controller 70 and/or the device control module 76 may make multiple selections of image processing methods to process image data 242 in parallel to determine the residue value 230.

Figure 5:
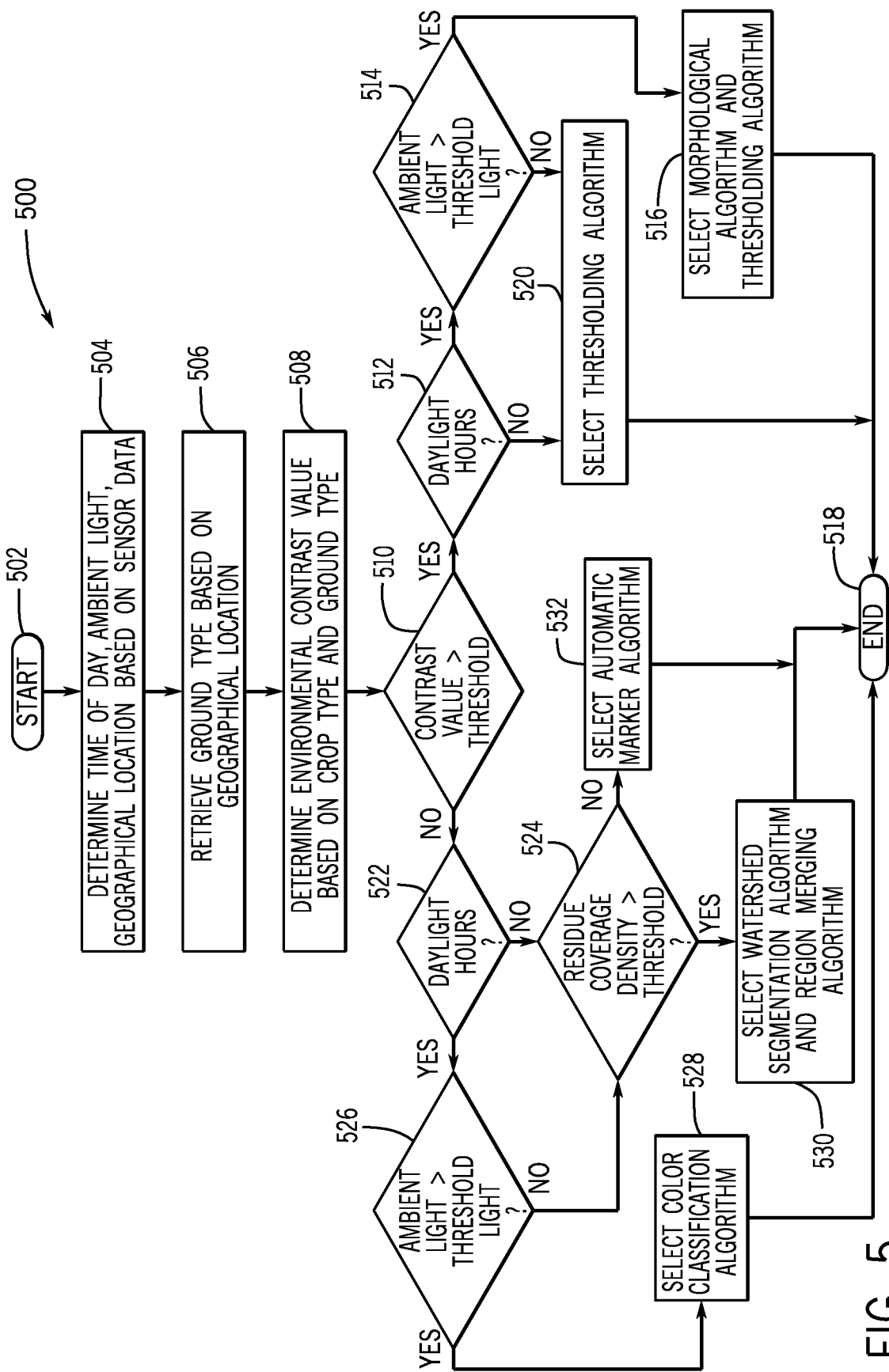
FIG. 5 is a flowchart illustrating a control method for selecting an image processing method in accordance with various embodiments.

Referring to FIG. 5, the method begins at 502. At 504, the method determines the time of day based on the clock data 238; determines the amount of ambient light based on the ambient light data 234; and determines the geographical location of the work vehicle 12 and/or tillage implement 10 based on the GPS data 236. At 506, the method retrieves the ground type 310 from the region data store 304 based on the geographical location. At 508, the method determines the environmental contrast value 312 based on the ground type 310 and the crop type 220 received via the input data 216. Based on the environmental contrast value 312, the amount of ambient light, the time of day and the residue coverage density value 222, the method queries the method tables data store 308 and retrieves the one or more selected image processing methods 240.

Blocks 510-532 represent an example method for selecting the one or more image processing methods from method tables data store 308. At 510, the method determines whether the environmental contrast value 312 is greater than a threshold value. If true, at 512, the method determines whether the time of day indicates daylight hours. If the time of day associated with daylight hours, at 514, the method determines whether the ambient light surrounding the work vehicle 12 is greater than an ambient light threshold. If the ambient light is greater than the ambient light threshold, such that the work vehicle 12 is in full daylight conditions, at 516, the method selects the morphological image processing method and the thresholding image processing method. The method ends at 518.

If, at 512, the time of day is associated with daylight hours, such as hours associated with dusk or night, the method proceeds to 520. At 520, the method selects the thresholding image processing method and ends at 518. If, at 514, the ambient light is less than the ambient light threshold (i.e. the work vehicle 12 is in reduced daylight conditions), the method proceeds to 520.

Otherwise, if the environmental contrast value 312 is less than the threshold at 510, the method proceeds to 522. At 522, the method determines whether the time of day indicates daylight hours. If the time of day is not associated with daylight hours, the method proceeds to 524. If, however, the time of day is associated with daylight hours, the method proceeds to 526 and determines whether the ambient light is greater than the ambient light threshold. If the ambient light is greater than the ambient light threshold, at 528, the method selects the color based classification image processing method and ends at 518.

Otherwise, at 526, if the ambient light is less than the ambient light threshold, the method proceeds to 524. At 524, the method determines whether the residue coverage density is greater than a threshold for residue coverage density, such as greater than about 50% covered. If the residue coverage density is greater than the threshold, the method, at 530, selects the watershed segmentation image processing method and the region merging image processing method and ends at 518.

If the residue coverage density is not greater than the threshold, at 532, the method selects the automatic marker color classification image processing method and ends at 518.

With reference back to FIG. 4, with the one or more image processing methods selected at 408, the method proceeds to 410. At 410, the method determines whether image data 242 has been received. If image data 242 has been received, the method proceeds to 412. Otherwise, the method proceeds to wait for image data 242. At 412, the method processes the image data 242 according to the selected one or more image processing methods. At 414, the method determines a value corresponding to the residue coverage (i.e. residue value 230) based on the results of the image processing. At 416, the method generates one or more control signals for the tillage implement 10 and/or work vehicle 12 (i.e. implement control data 256 and/or vehicle control data 258) based on the residue value 230 to arrive at the desired residue value 226. Block 414 is optional if the control method 400 is implemented on the device control module 76 of the portable electronic device 62.

Figure 6:
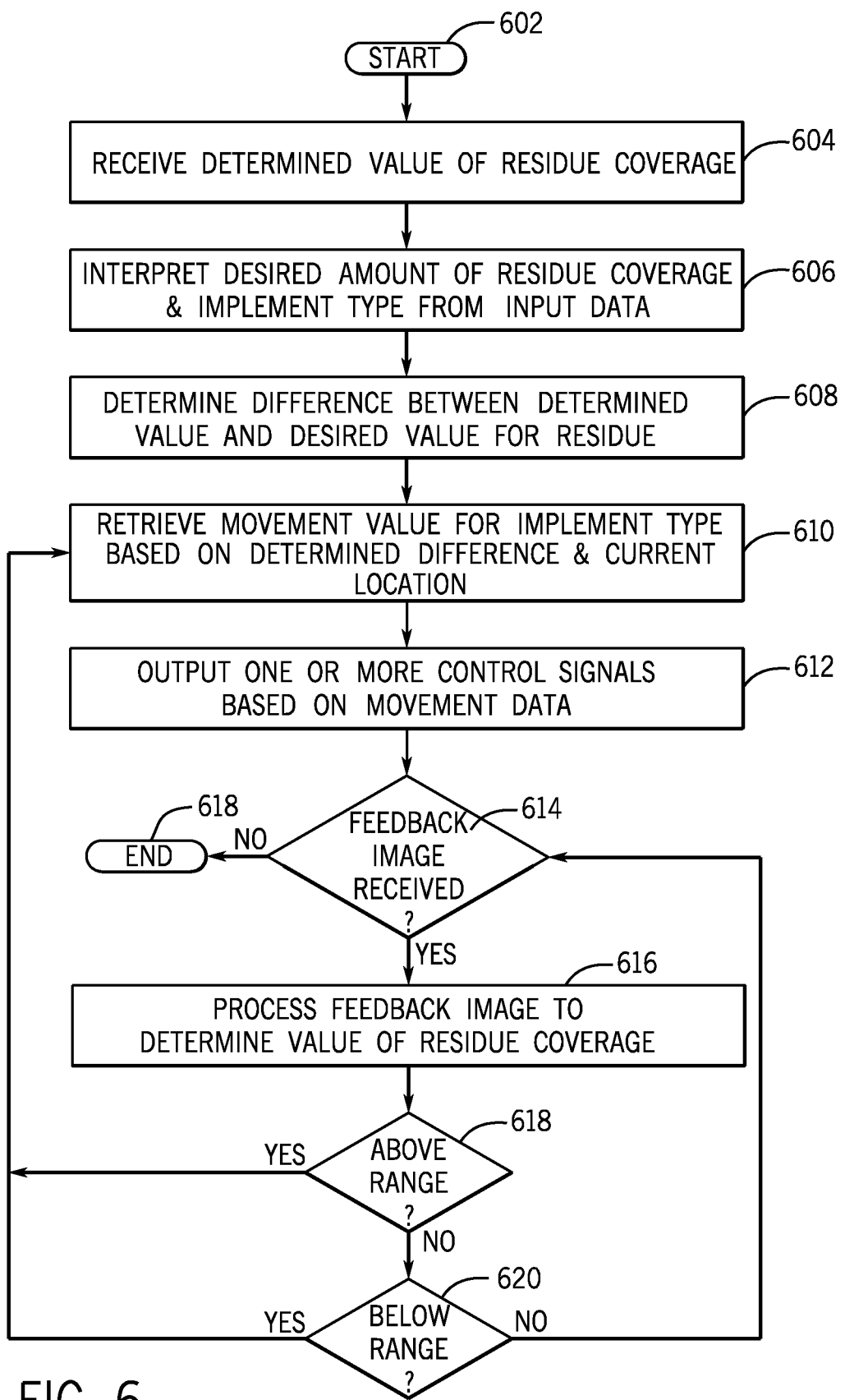
FIG. 6 is a flowchart illustrating a control method for controlling an implement in accordance with various embodiments.

With reference to FIG. 6, a flowchart illustrates a control method 600 for controlling an implement that may be performed by the controller 70 and/or the device control module 76 of FIGS. 1-3 in accordance with the present disclosure. Referring to FIG. 6, the method begins at 602. At 604, the method receives the determined value that corresponds to the residue coverage in the imaged area of the field 14, or the residue value 230. At 606, the method interprets the desired amount of residue coverage for the field 14 and the implement type 224 from the input data 216. At 608, the method determines the difference between the determined amount of residue coverage and the desired amount of residue coverage for the field 14. At 610, the method retrieves the movement value 252 for the type of tillage implement 10 based on the determined difference and the data from the sensors of the depth control device 50 (i.e. location data 254). At 612, the method outputs one or more control signals to the controller 26 based on the movement value 252.

At 614, the method determines whether additional image data 242 is received, such as local image data 244, which comprises a feedback image. In this regard, the local image data 244 may comprise an aft image taken from the aft camera assembly 54, which provides an imaged area of the field 14 after tillage by the tillage implement 10. If the feedback image is received, the method proceeds to 616. Otherwise, the method ends at 618.

At 616, the method processes the feedback image according to the selected one or more image processing methods to determine the value of residue coverage for the imaged area of the field 14 in the feedback image. At 618, the method determines whether the value of the residue coverage in the feedback image is above a range, such as about 10%. If the value is above the range, the method proceeds to 610. Otherwise, at 620, the method determines whether the value of the residue coverage in the feedback image is below a range, such as about negative 10%. If the value is below the range, the method proceeds to 610. Otherwise, the method loops to 614.

With reference back to FIG. 4, the method at 418, determines whether additional image data 242 has been received. For example, the additional image data 242 may comprise a different portion of the field 14. If additional image data 242 has been received, the method proceeds to 412. Otherwise, the method ends at 420.

In some embodiments, the controller 70 and/or device control module 76 may process image data 242 from the camera assemblies 58, 74, 82 to determine a levelness of the field or a quality of the tillage operation by the tillage implement 10, and may generate one or more control signals to control the tillage implement 10 based on the determined levelness or quality. Example controller 70 include a computer usable or computer readable medium such as an electronic circuit, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

Finally, the orientation and directions stated and illustrated in this disclosure should not be taken as limiting. Many of the orientations stated in this disclosure and claims are with reference to the direction of travel of the equipment. But, the directions, e.g. "behind" can also are merely illustrative and do not orient the embodiments absolutely in space. That is, a structure manufactured on its "side" or "bottom" is merely an arbitrary orientation in space that has no absolute direction. Also, in actual usage, for example, the cultivator may run on a side hill, in which case "top" may be pointing to the side or upside down. Thus, the stated directions in this application may be arbitrary designations.

In the present disclosure, the descriptions and example embodiments should not be viewed as limiting. Rather, there are variations and modifications that may be made without departing from the scope of the appended claims.

What is claimed is:

1. A system for residue detection and implement control, the system comprising:
    an agricultural implement having one or more ground engaging tools, wherein the system for residue detection and implement control has access to a source of environmental data having an indication of environmental factors;
    a sensor that obtains image data of a field;
    a data store containing a plurality of image processing methods to detect residue;
    a controller operatively coupled to the sensor and to the source of environmental data and to the data store, the controller processing the image data according to one or more of the plurality of image processing methods;
    wherein the controller:
        selects one or more of the plurality of image processing methods based on the environmental data;
        determines an environmental contrast based on the environmental data, and selects the one or more of the plurality of image processing methods based on the environmental contrast;
        processes the image data using the selected one or more of the plurality of image processing methods to determine a value of residue coverage on a ground surface in the imaged area of the field; and
        generates one or more control signals that includes an adjustment to the agricultural implement having one or more ground engaging tools based on the value of residue coverage on the ground surface to reduce the value of residue coverage, wherein the sensor comprises a first sensor configured to obtain forward image data of the field in front of the agricultural implement and a second sensor configured to obtain aft image data of the field behind the agricultural implement, and the controller is configured to compare the forward and aft image data to determine the change in value of residue coverage between the forward and aft image data.

2. The system of claim 1, wherein the sensor is at least one of a portable electronic device, a camera, an unmanned aerial vehicle, and a ground scout.

3. The system of claim 1, wherein the environmental data includes one or more of: a time of day, an ambient light, a geographical location, a residue coverage density, a ground type and a crop type.

4. The system of claim 1, wherein the plurality of image processing methods include a thresholding image processor, and the controller selects the thresholding image processor based on the environmental contrast being past a threshold.

5. The system of claim 1, wherein the plurality of image processing methods include a color based classification image process, and the controller selects the color based classification image process based on the environmental contrast being past a threshold.

6. The system of claim 1, wherein the plurality of image processing instructions includes a watershed segmentation image process, and the controller selects the watershed segmentation image process based on the environmental contrast being past a threshold.

7. The system of claim 1, wherein the plurality of image processing instructions includes an automatic marker color classification image process, and the controller selects the automatic marker color classification image process based on the environmental contrast being past a threshold.

8. The system of claim 1, wherein the plurality of image processing instructions includes a morphological image process, and the controller selects the morphological image process based on the environmental contrast being past a threshold.

9. The system of claim 1, wherein the environmental data includes a ground type and a crop type, and the controller determines the environmental contrast based on the ground type and the crop type.

10. The system of claim 1, wherein the environmental data includes a geographical location associated with the implement, and the controller determines a ground type for the field based on the geographical location.

11. The system of claim 1, further comprising circuits to send the value of residue coverage to a remote human-machine interface;
    wherein the circuits receive instructions from the remote human-machine interface to adjust the one or more ground engaging tools on the agricultural implement based on the value of residue coverage.

12. The system of claim 1, wherein the adjustment includes changing at least one of a level of the agricultural implement, a gang angle of the agricultural implement, an angle of ground engaging tools of the agricultural implement, a depth of ground engaging tools of the agricultural implement, and a distance between ground engaging tools of the agricultural implement.

13. A method to detect residue and control an agricultural implement having one or more ground engaging tools, the method comprising:
receiving, by a controller, environmental data having an indication of environmental factors;
receiving, by the controller, image data having an imaged area of a field containing residue coverage on a ground surface, wherein the image data of the field comprises forward image data of the field in front of the agricultural implement and aft image data of the field behind the agricultural implement;
selecting, by a controller, one or more of a plurality of image processing methods for processing the image data based on the environmental data;
determining, by the controller, an environmental contrast based on the environmental data, and wherein the selecting of the one or more of the plurality of image processing methods is based on the environmental contrast;
processing, by the controller, the image data based on the selected one or more of the plurality of image processing methods, wherein the processing comprises comparing the forward and aft image data;
determining, by the controller, a value corresponding to residue coverage on the ground surface in the imaged area of the field based on the processing, wherein the value comprises the change in value of residue coverage between the forward and aft image data based on the comparing; and
performing, by the controller, at least one of:
generating one or more control signals to adjust the agricultural implement having one or more ground engaging tools based on the value to reduce the value of residue coverage;
displaying an indication of the value on a hand-held interface device; and
displaying an indication of the value on a computer console in an agricultural vehicle.

14. The method of claim 13, further comprising:
receiving a portion of the environmental data from a human-machine interface operably coupled to the controller; and receiving the image data from at least one of a portable electronic device, a camera, a drone and a ground scout.

15. The method of claim 13, wherein receiving image data having an imaged area of a field containing residue coverage on a ground surface includes receiving a forward image data of the field in front of the agricultural implement and an aft image data of the field behind the agricultural implement, and wherein determining, by the controller, a value corresponding to residue coverage on the ground surface in the imaged area of the field based on the processing includes comparing the forward and aft image data to determine the change in value of residue coverage between the forward and aft image data.

16. A system for residue detection and implement control, the system comprising:
a source of environmental data having an indication of environmental factors, the environmental data including at least a crop type associated with a field and a geographical location;
a sensor that captures image data having an imaged area of the field containing residue coverage on a ground surface;
a data store containing a plurality of image processing instruction sets; and
a controller operatively coupled to the source of environmental data and to the sensor and the data store, the controller processing the image data according to one or more of the plurality of image processing instruction sets;
wherein the controller that:
determines of a ground type based on the geographical location;
determines an environmental contrast based on the crop type and the ground type;
selects one or more of the plurality of image processing instruction sets based at least in part on the environmental contrast;
analyzes the image data using the selected one or more of the plurality of image processing instruction sets to determine a value corresponding to residue coverage on the ground surface in the imaged area of the field; and
generates a command to adjust a configuration of an agricultural implement having one or more ground engaging tools to reduce the value of residue coverage, wherein the sensor comprises a first sensor configured to obtain forward image data of the field in front of the agricultural implement and a second sensor configured to obtain aft image data of the field behind the agricultural implement, and the controller is configured to compare the forward and aft image data to determine the change in value of residue coverage between the forward and aft image data.

17. The system of claim 16, wherein the agricultural implement is a harrow including a harrow tool coupled to an actuator in communication with the controller; and
wherein the controller generates one or more control signals for the implement based on the value, and wherein the harrow tool is movable by the actuator based on the command.

18. The system of claim 16, wherein the plurality of image processing instruction sets include a thresholding method, a color based classification, a watershed segmentation, an automatic marker color classification, and a morphological image process.

* * * * *